US007841936B2

(12) United States Patent
Berman et al.

(10) Patent No.: US 7,841,936 B2
(45) Date of Patent: Nov. 30, 2010

(54) SYSTEM AND METHOD FOR PRESENTING PAYOUTS IN GAMING SYSTEMS

(75) Inventors: Bradley Berman, Minnetonka, MN (US); Adam Martin, St. Louis Park, MN (US); Ryan Strand, Plymouth, MN (US)

(73) Assignee: IGT, Reno, NV (US)

( * ) Notice: Subject to any disclaimer, the term of this patent is extended or adjusted under 35 U.S.C. 154(b) by 1418 days.

(21) Appl. No.: 10/985,350

(22) Filed: Nov. 9, 2004

(65) Prior Publication Data

US 2005/0119043 A1 Jun. 2, 2005

Related U.S. Application Data

(63) Continuation-in-part of application No. 10/665,915, filed on Sep. 19, 2003, now Pat. No. 6,997,804, which is a continuation-in-part of application No. 09/906,283, filed on Jul. 16, 2001, now Pat. No. 6,632,140.

(60) Provisional application No. 60/519,352, filed on Nov. 9, 2003.

(51) Int. Cl.
*A63F 13/00* (2006.01)

(52) U.S. Cl. .......................................... 463/20; 463/25

(58) Field of Classification Search .................. 463/20, 463/25

See application file for complete search history.

(56) References Cited

U.S. PATENT DOCUMENTS 4,448,419 A 5/1984 Telnaes
4,618,150 A 10/1986 Kimura
4,695,053 A 9/1987 Vazquez, Jr. et al.
5,205,555 A 4/1993 Hamano
5,332,219 A 7/1994 Marnell et al.

(Continued)

FOREIGN PATENT DOCUMENTS

EP 0 874 337 A1 10/1998

(Continued)

OTHER PUBLICATIONS

Wheel of Fortune. <URL: http://en.wikipedia.org/wiki/Wheel_of_Fortune_(US_game_show)>.*

(Continued)

*Primary Examiner*—John M Hotaling, II
(74) *Attorney, Agent, or Firm*—K & L Gates LLP

(57) ABSTRACT

A system and method for facilitating participation by a player in a primary or bonus event of a slot machine. A plurality of rotatable shapes such as wheels, with symbols presented thereon, are spun. Each of the rotatable shapes is associated with at least one respective segment designator to identify at least one of the symbols on that rotatable shape as active for that spin. Each rotatable shape is allowed to perform subsequent spins if the segment designator for that shape on the current spin did not identify a discontinue symbol. Spins therefore continue for each of the rotatable shapes until all rotatable shapes have been associated with a discontinue symbol, or another termination event occurs. Payouts may be associated with some or all of the continue symbols, such that a total payout continues to accumulate at the rotatable shapes are allowed to perform additional spins.

45 Claims, 28 Drawing Sheets

U.S. PATENT DOCUMENTS

| | | | |
|---|---|---|---|
| 5,393,061 A | 2/1995 | Manship et al. | |
| 5,449,173 A | 9/1995 | Thomas et al. | |
| 5,456,465 A | 10/1995 | Durham | |
| 5,611,535 A | 3/1997 | Tiberio | |
| 5,697,843 A | 12/1997 | Manship et al. | |
| 5,704,835 A | 1/1998 | Dietz, II | |
| 5,722,891 A | 3/1998 | Inoue | |
| 5,725,428 A | 3/1998 | Achmuller | |
| 5,752,881 A | 5/1998 | Inoue | |
| 5,788,573 A | 8/1998 | Baerlocher et al. | |
| 5,823,874 A | 10/1998 | Adams | |
| 5,848,932 A | 12/1998 | Adams | |
| 5,851,148 A | 12/1998 | Brune et al. | |
| 5,882,261 A | 3/1999 | Adams | |
| 5,890,962 A | 4/1999 | Takemoto | |
| 5,911,418 A | 6/1999 | Adams | |
| 5,934,998 A | 8/1999 | Forte et al. | |
| 5,947,820 A | 9/1999 | Morro et al. | |
| 5,980,384 A | 11/1999 | Barrie | |
| 5,997,401 A | 12/1999 | Crawford | |
| 6,004,207 A | 12/1999 | Wilson, Jr. et al. | |
| 6,004,208 A | 12/1999 | Takemoto et al. | |
| 6,015,346 A | 1/2000 | Bennett | |
| 6,033,307 A | 3/2000 | Vancura | |
| 6,059,658 A | 5/2000 | Mngano et al. | |
| 6,062,980 A | 5/2000 | Luciano | |
| 6,089,978 A | 7/2000 | Adams | |
| 6,095,921 A | 8/2000 | Walker et al. | |
| 6,102,798 A | 8/2000 | Bennett | |
| 6,142,873 A | 11/2000 | Weiss et al. | |
| 6,159,097 A | 12/2000 | Gura | |
| 6,159,098 A | 12/2000 | Slomiany et al. | |
| 6,162,121 A | 12/2000 | Morro et al. | |
| 6,165,071 A | 12/2000 | Weiss | |
| 6,168,520 B1 * | 1/2001 | Baerlocher et al. | 463/16 |
| 6,173,955 B1 | 1/2001 | Perrie et al. | |
| 6,174,235 B1 | 1/2001 | Walker et al. | |
| 6,186,894 B1 | 2/2001 | Mayeroff | |
| 6,190,254 B1 | 2/2001 | Bennett | |
| 6,190,255 B1 | 2/2001 | Thomas et al. | |
| 6,200,217 B1 | 3/2001 | Osawa | |
| 6,224,483 B1 | 5/2001 | Mayeroff | |
| 6,227,971 B1 | 5/2001 | Weiss | |
| 6,231,442 B1 | 5/2001 | Mayeroff | |
| 6,234,897 B1 | 5/2001 | Frohm et al. | |
| 6,270,408 B1 | 8/2001 | Sakamoto et al. | |
| 6,270,411 B1 | 8/2001 | Gura et al. | |
| 6,270,412 B1 | 8/2001 | Crawford et al. | |
| 6,299,165 B1 | 10/2001 | Nagano | |
| 6,309,300 B1 | 10/2001 | Glavich | |
| 6,315,660 B1 | 11/2001 | DeMar et al. | |
| 6,315,663 B1 | 11/2001 | Sakamoto | |
| 6,334,814 B1 | 1/2002 | Adams | |
| 6,364,768 B1 | 4/2002 | Acres et al. | |
| 6,398,218 B1 | 6/2002 | Vancura | |
| 6,569,015 B1 | 5/2003 | Baerlocher et al. | |
| 6,632,139 B1 | 10/2003 | Baerlocher | |
| 6,634,945 B2 | 10/2003 | Glavich et al. | |
| 6,648,757 B1 | 11/2003 | Slomiany et al. | |
| 6,692,355 B2 | 2/2004 | Baerlocher et al. | |
| 7,014,560 B2 | 3/2006 | Glavich et al. | |
| 7,250,001 B2 | 7/2007 | Baerlocher et al. | |
| 2003/0027628 A1 * | 2/2003 | Luciano | 463/20 |
| 2003/0064796 A1 * | 4/2003 | Glavich et al. | 463/25 |

FOREIGN PATENT DOCUMENTS

| | | |
|---|---|---|
| EP | 0 945 837 A2 | 9/1999 |
| EP | 0 984 409 A2 | 8/2000 |

OTHER PUBLICATIONS

Bonus Spin Advertisement written by IGT, published prior 2000.
Double Diamond Run Advertisement written by IGT, published in 2001.
Fortune Cookie Advertisement written by IGT, published in 2001.
Little Devils Advertisement written by IGT, published in 2000.
On the Money Article written by Strictly Slots, published in 2000.
Price is Right Advertisement written by IGT, published in 2001.
Psycho Cash Beast Advertisement written by IGT, published in 1999.
Texas Tea Advertisement written by IGT, published in 2000.
Wheel of Fortune Advertisement written by IGT, published in 1997.
Winning Streak Advertisement written by Aristocrat, published in 1994.

* cited by examiner

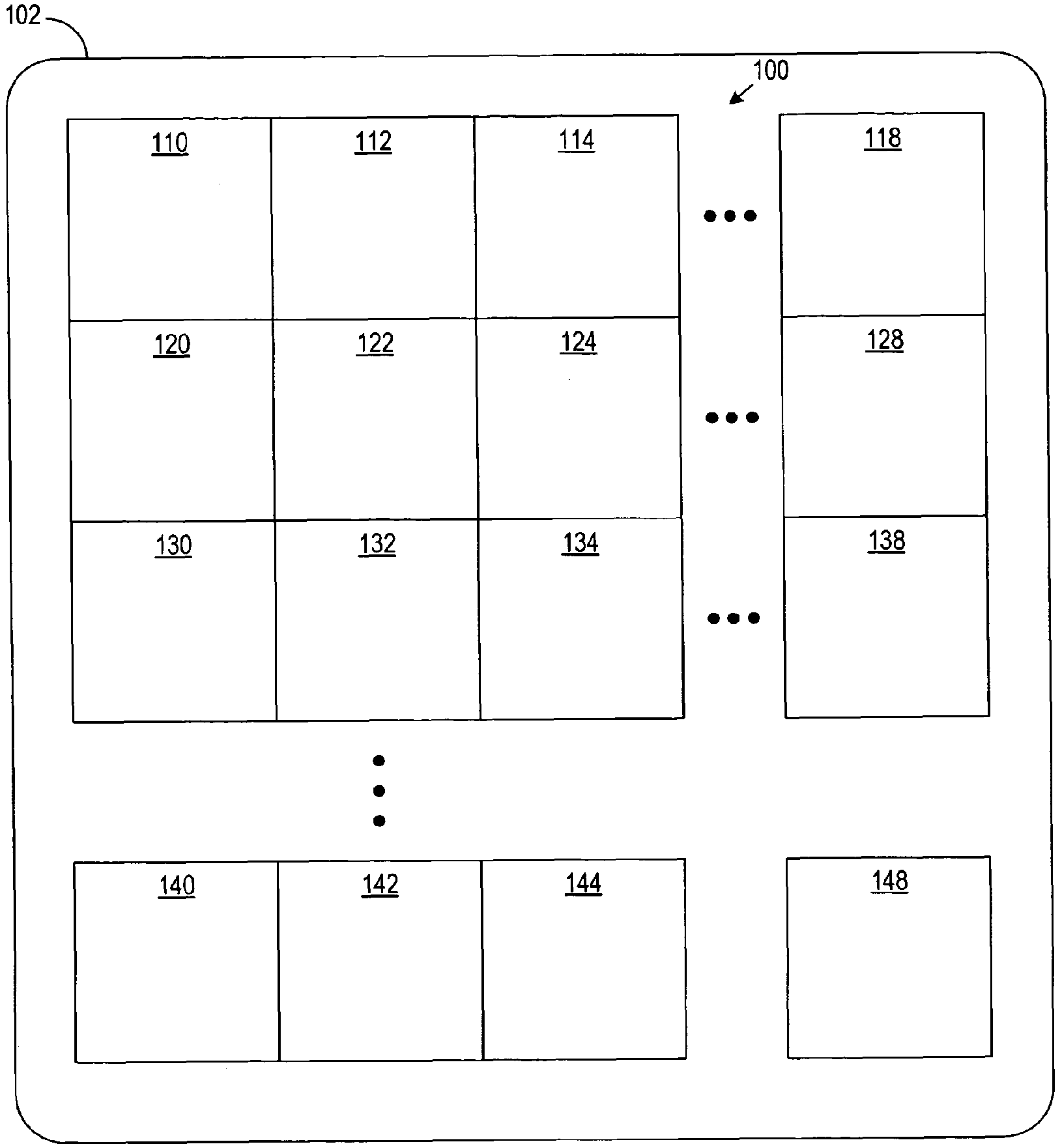
FIG. 1-A

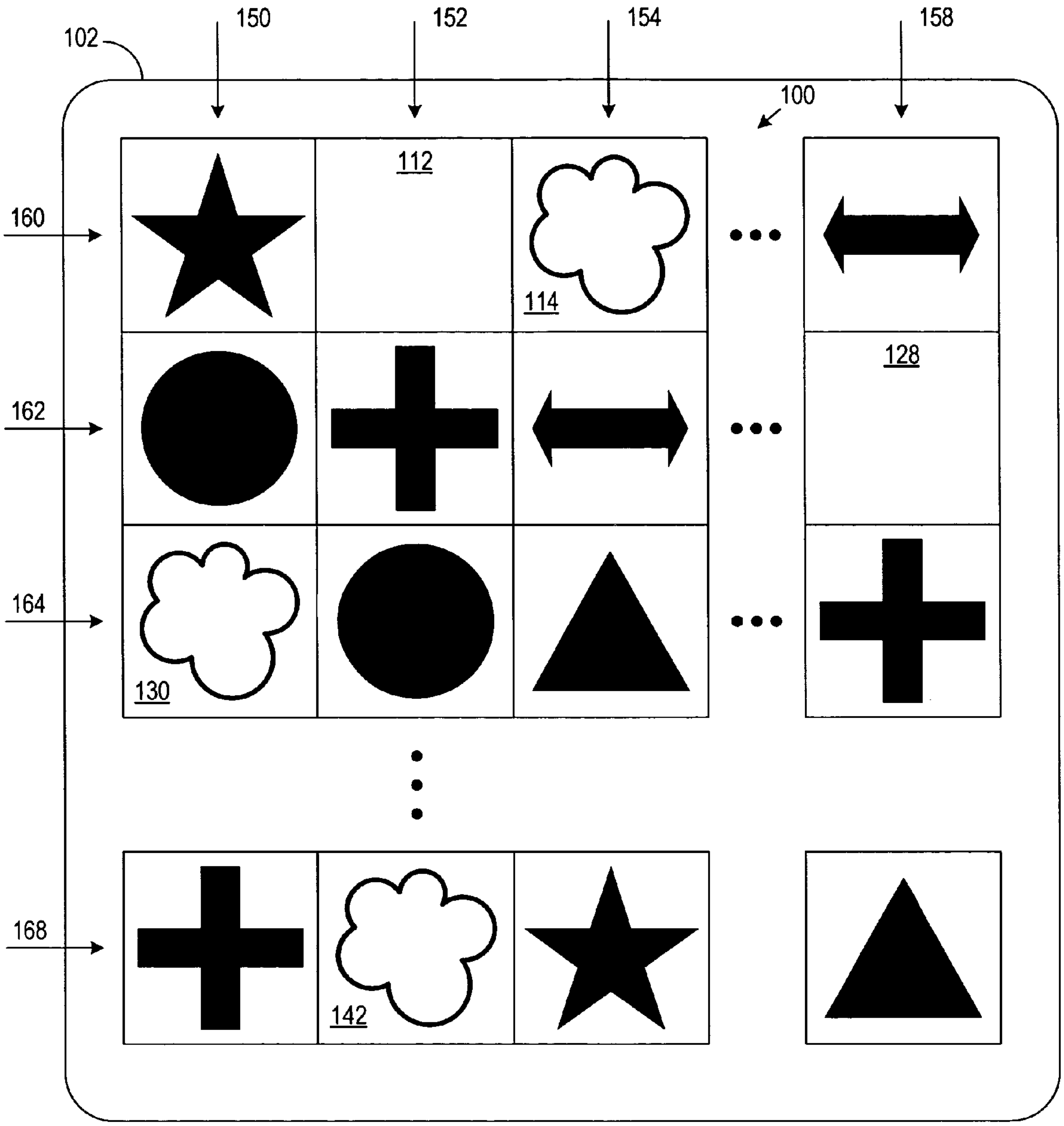
*FIG. 1-B*

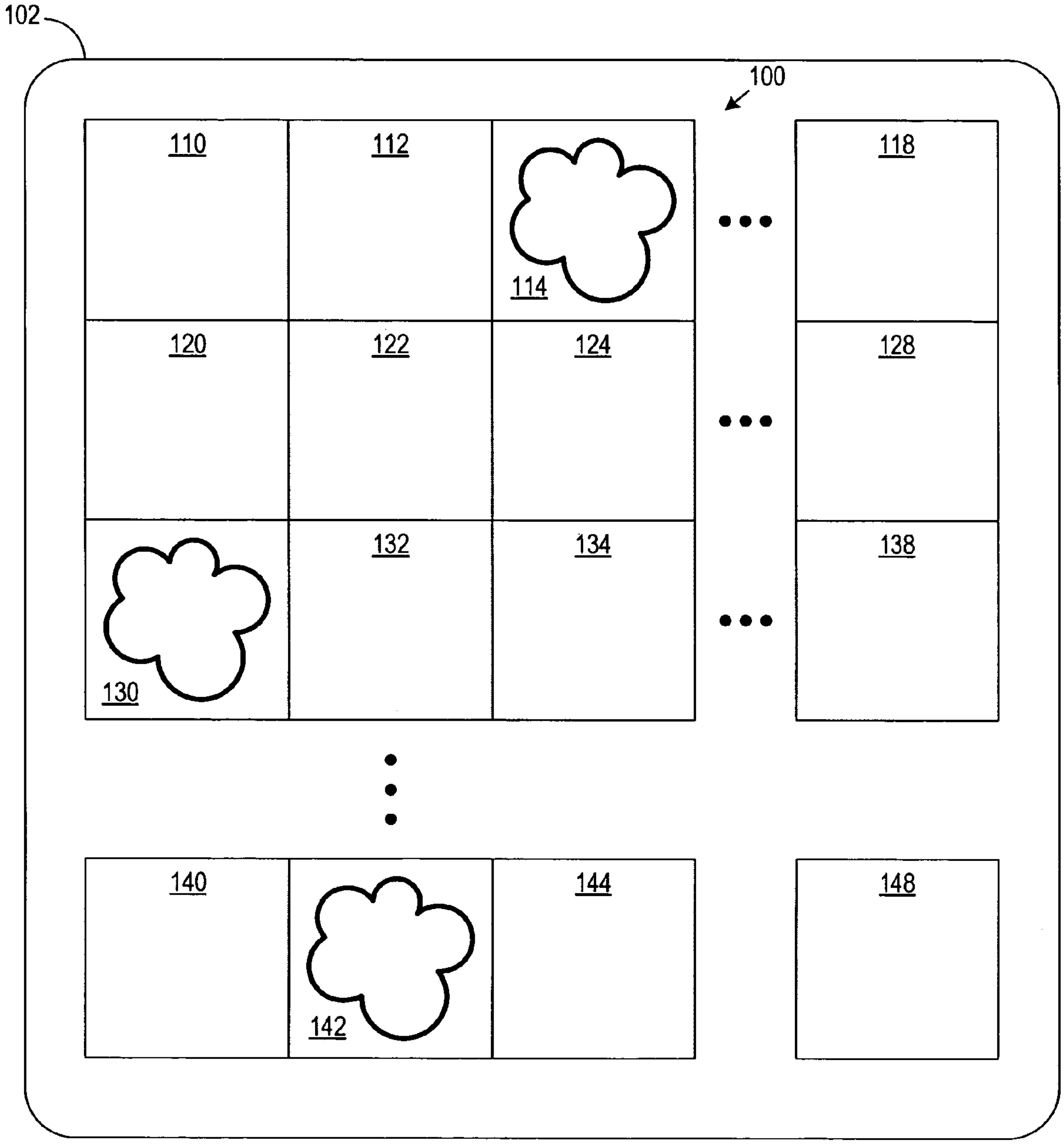
FIG. 1-C

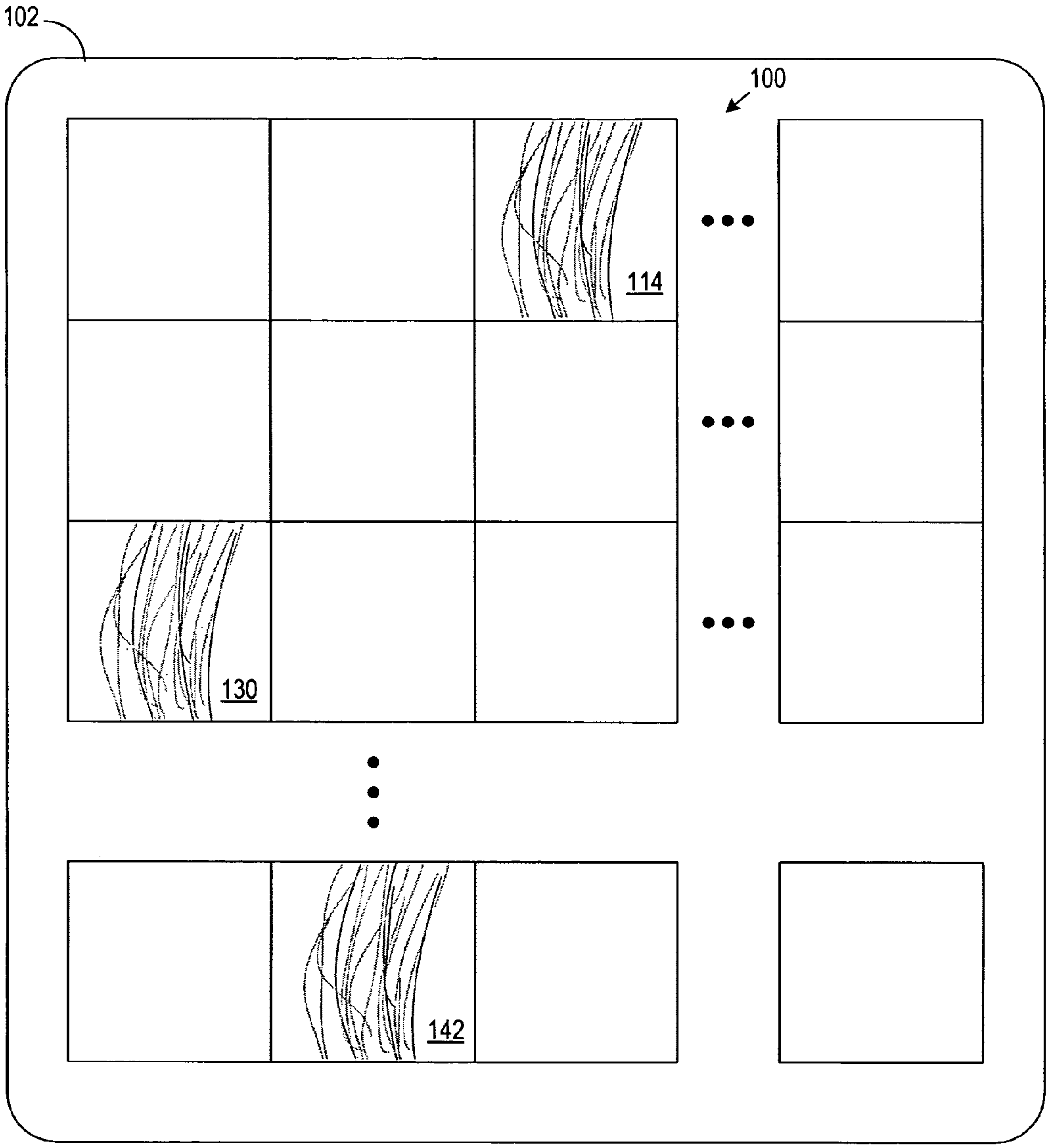
*FIG. 1-D*

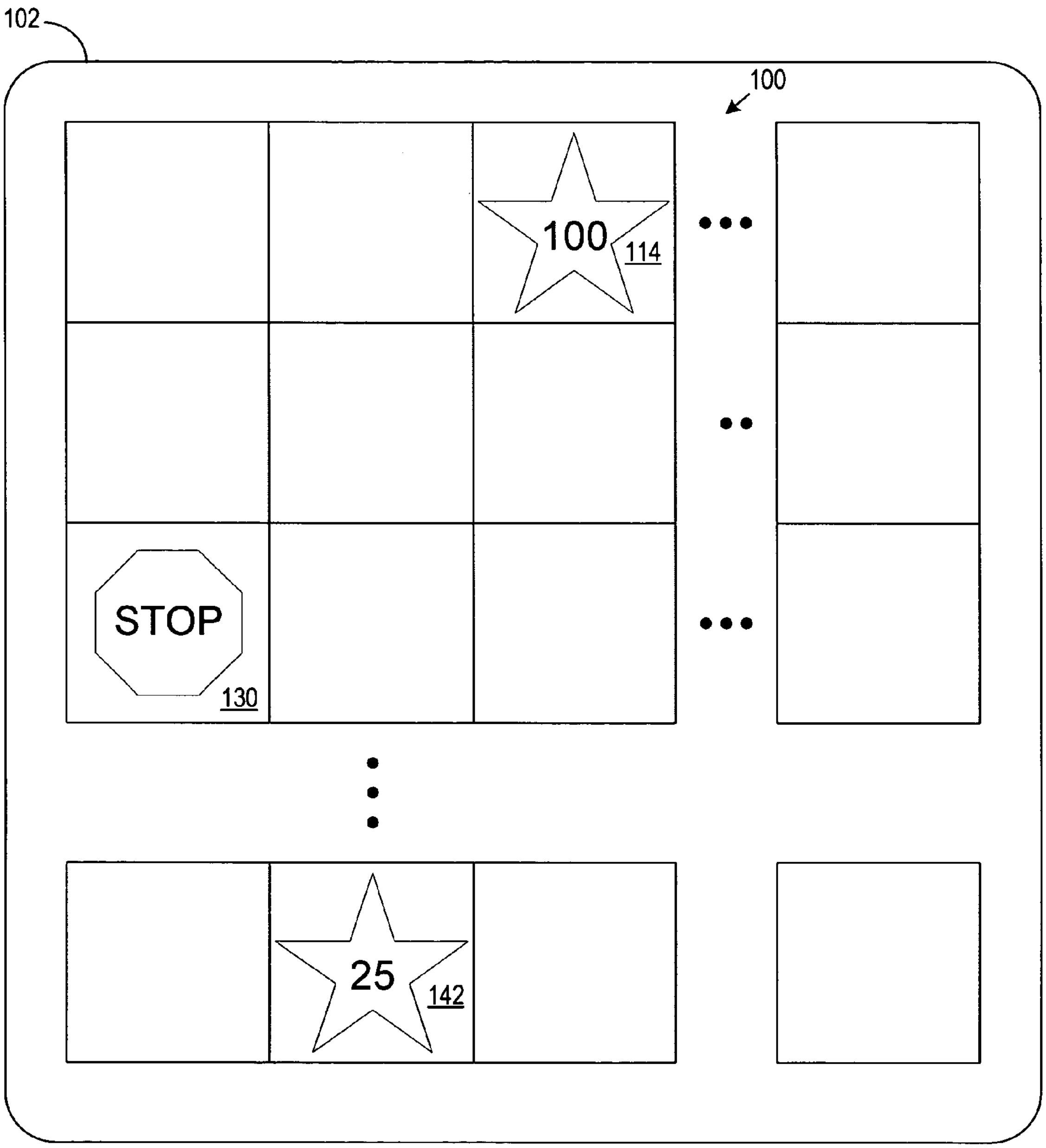
FIG. 1-E

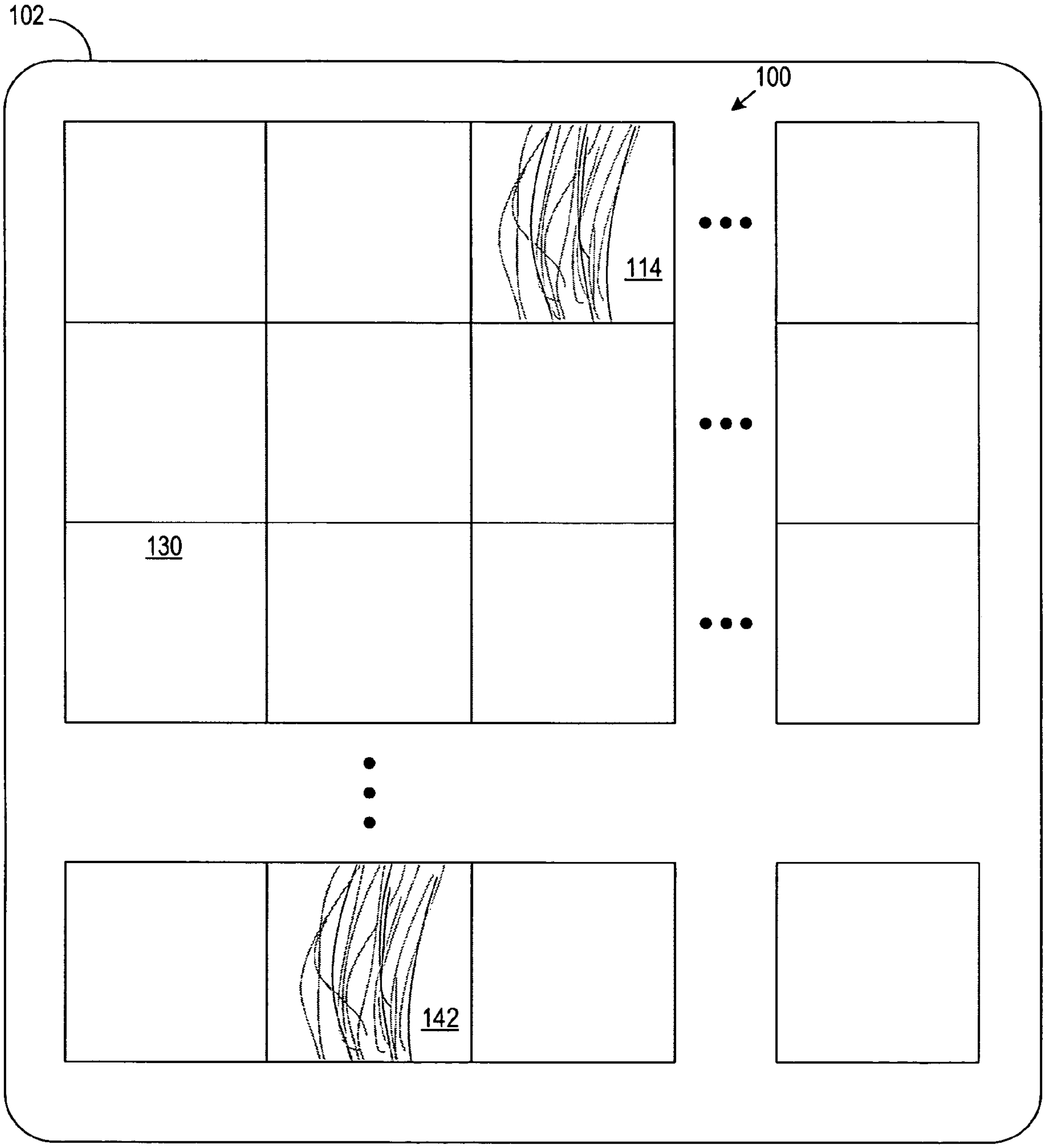
*FIG. 1-F*

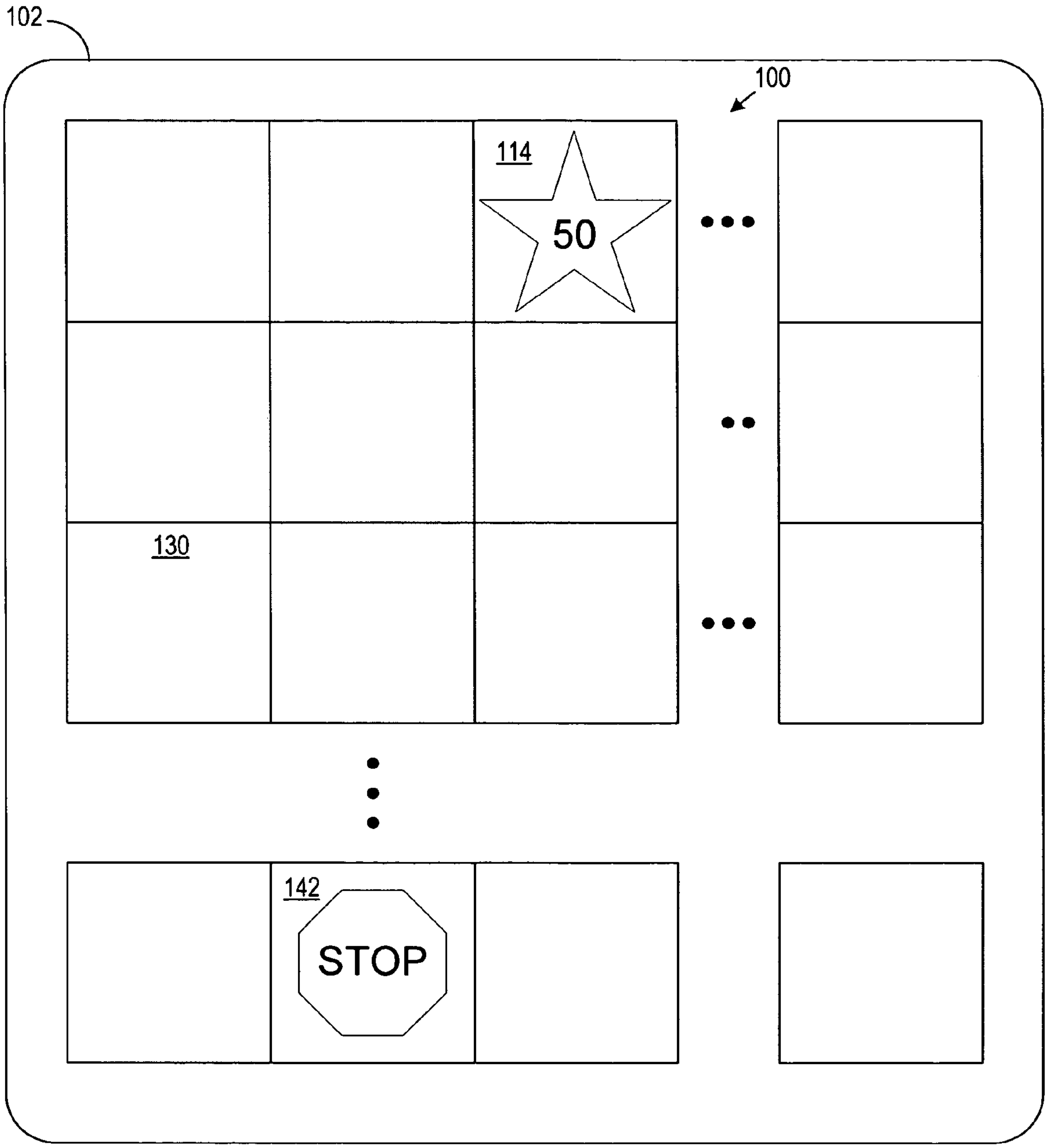
*FIG. 1-G*

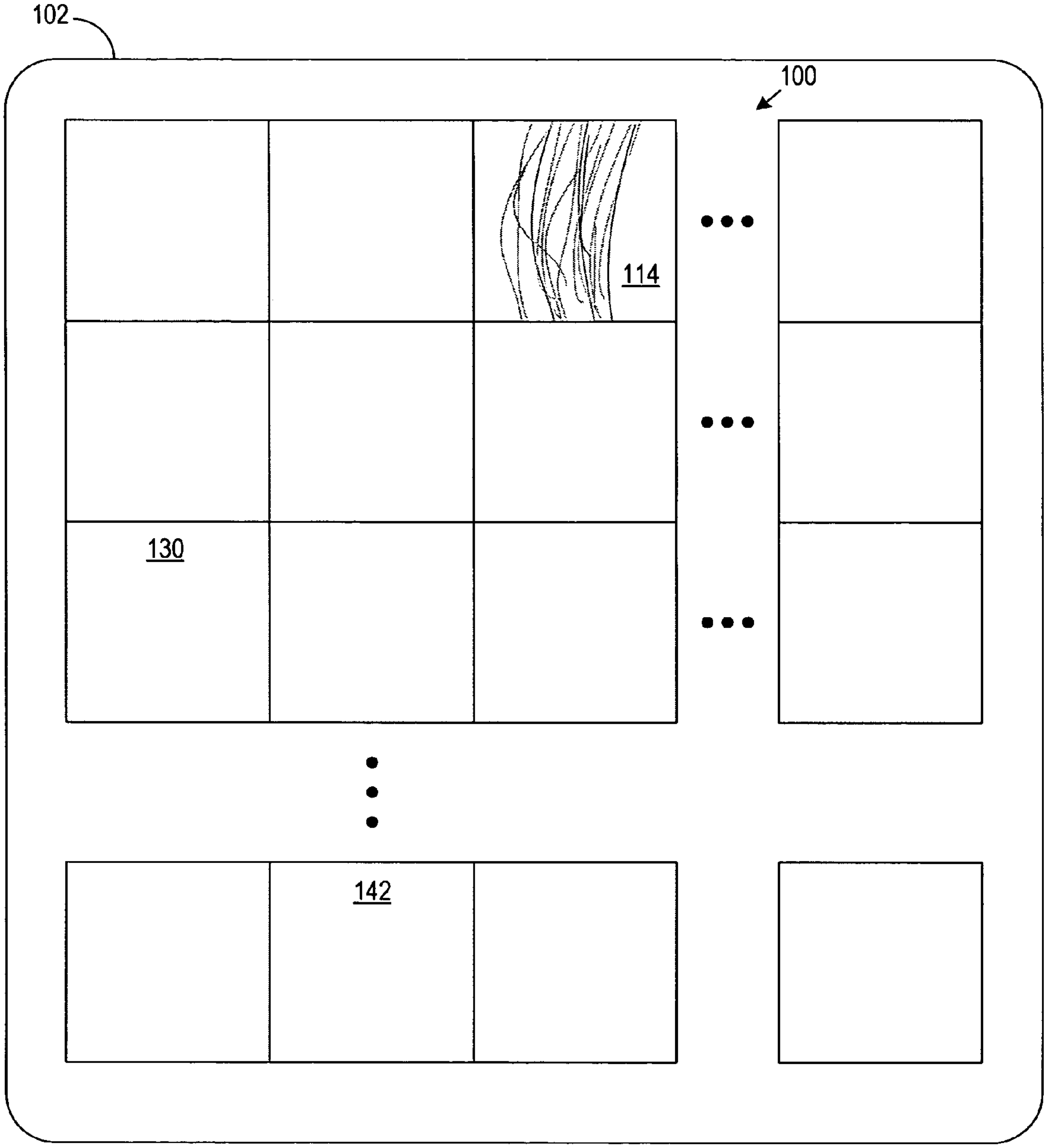
FIG. 1-H

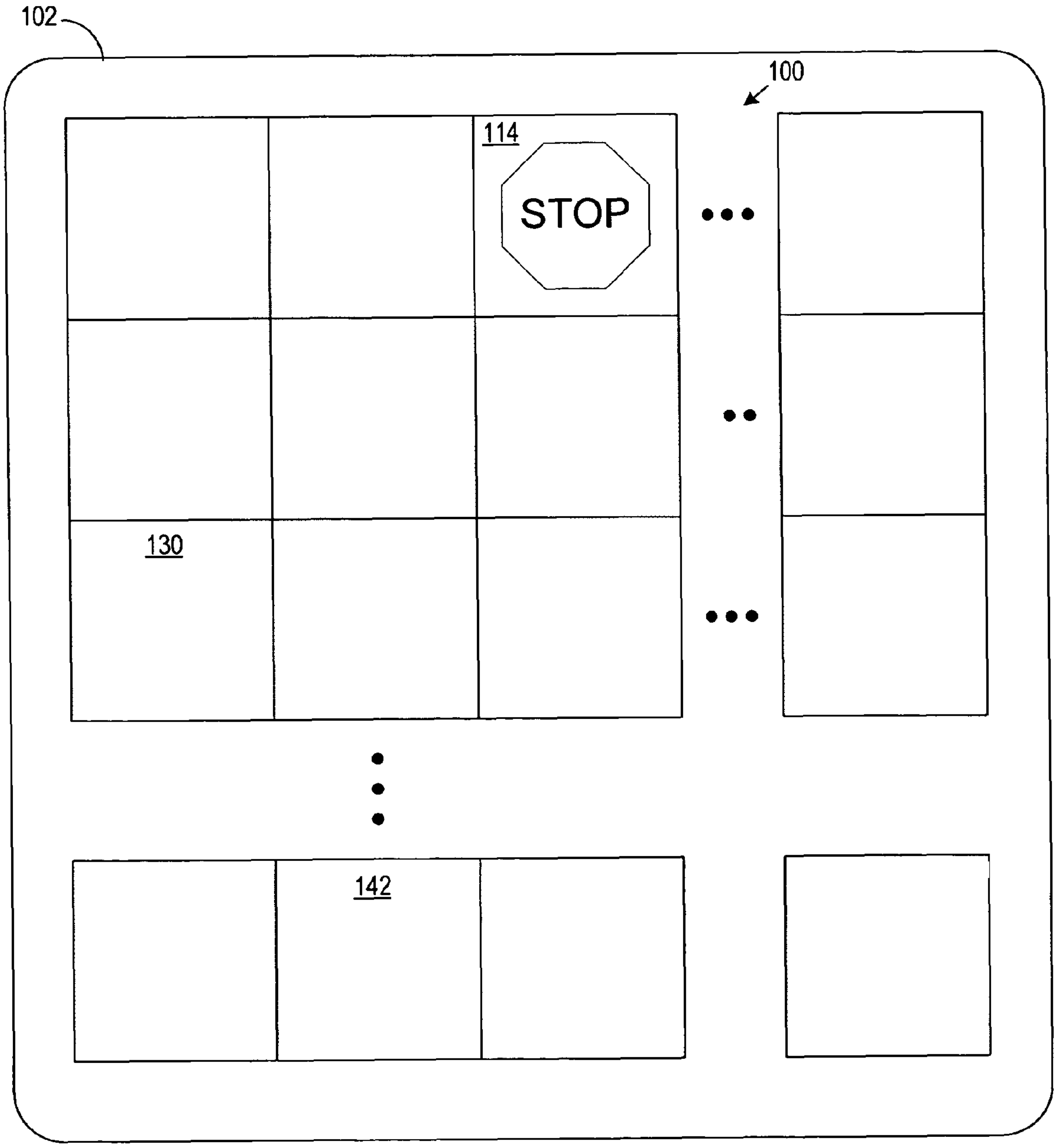
*FIG. 1-I*

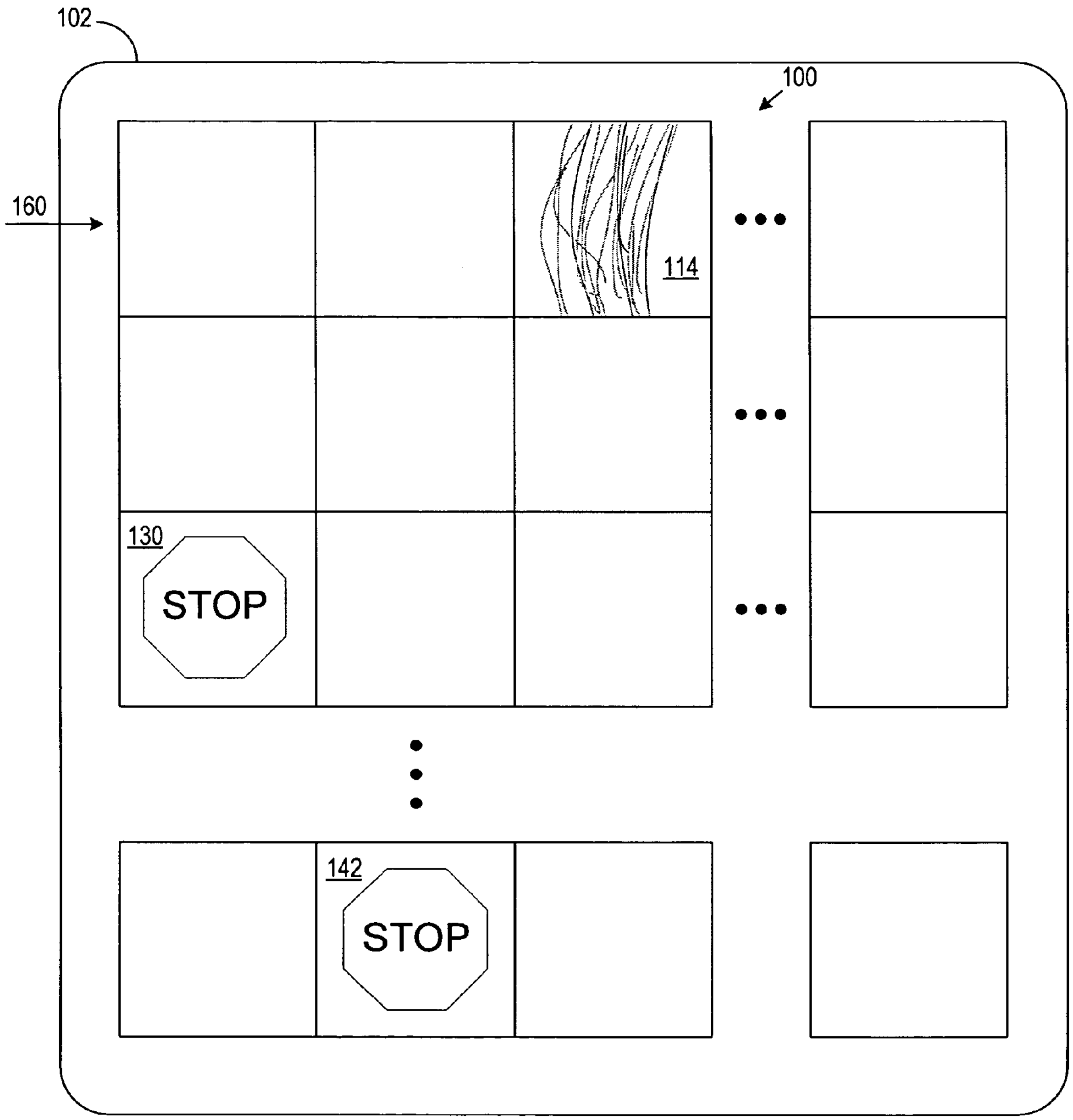
FIG. 1-J

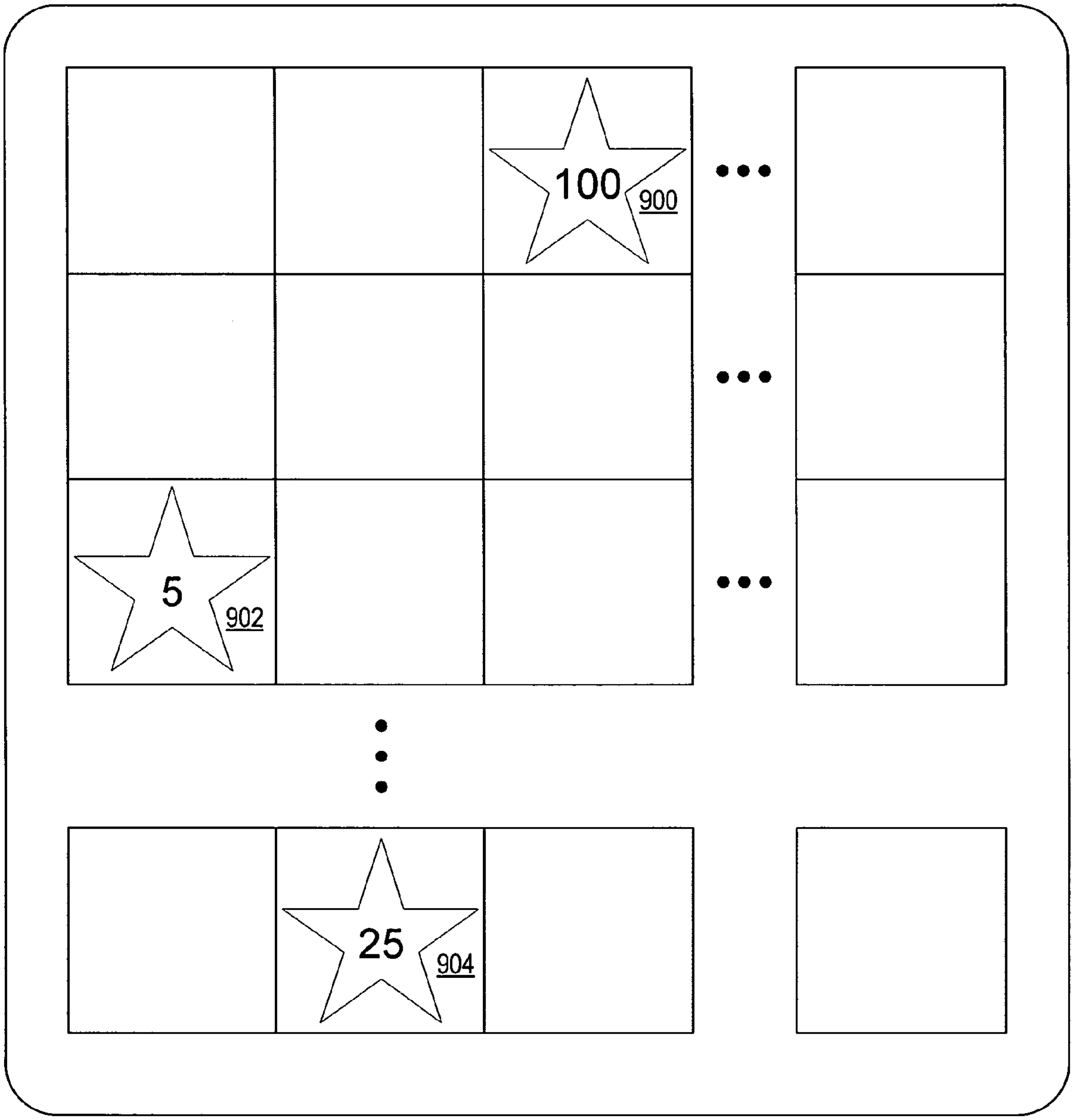
FIG. 9-A

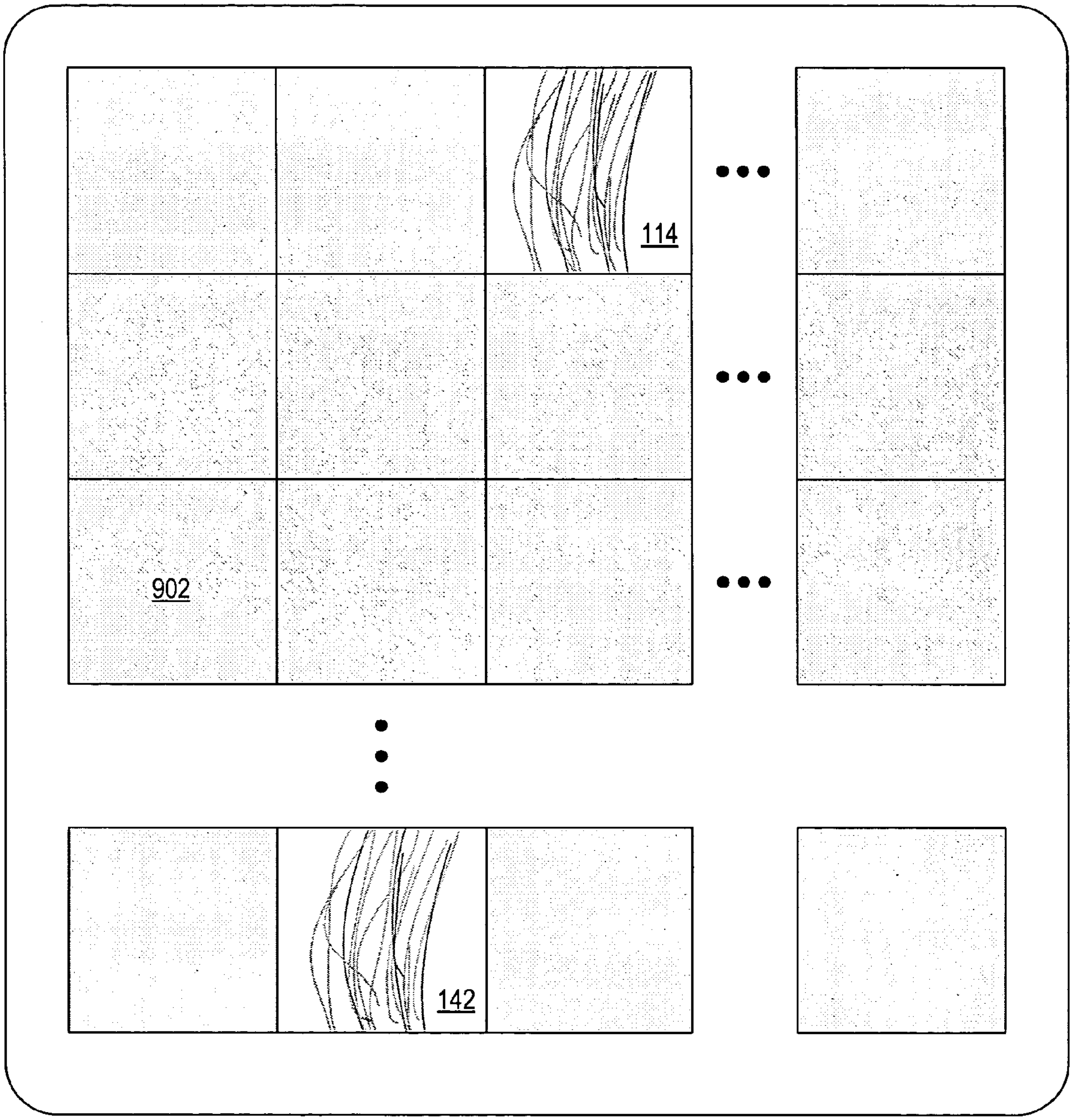
*FIG. 9-B*

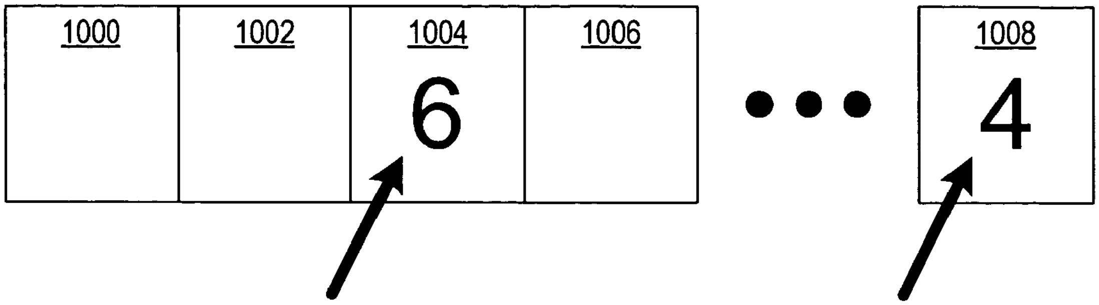
FIG. 10-A
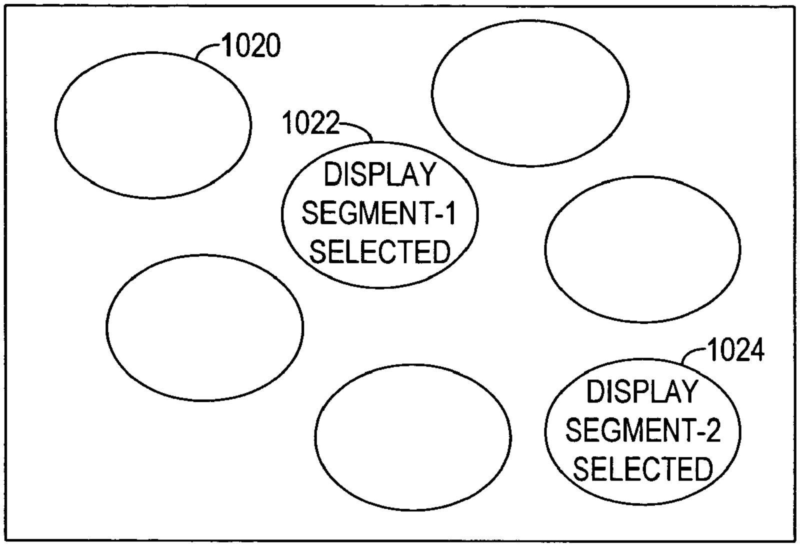
FIG. 10-B
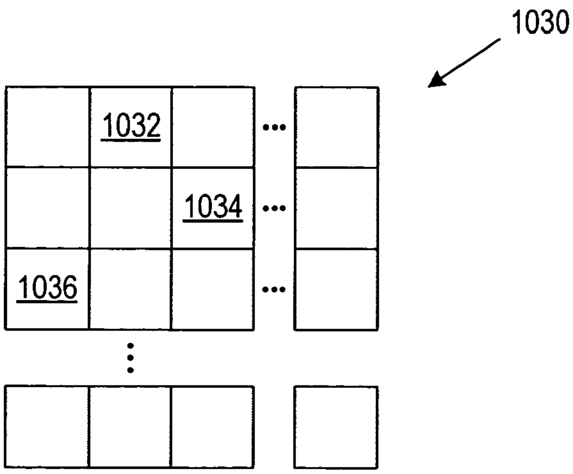
FIG. 10-C

SYSTEM AND METHOD FOR PRESENTING PAYOUTS IN GAMING SYSTEMS

RELATED APPLICATIONS

This application claims the benefit of U.S. Provisional Application No. 60/519,352, filed on Nov. 9, 2003, and is a continuation-in-part application of application Ser. No. 10/665,915, filed Sep. 19, 2003 now U.S. Pat. No. 6,997,804, which is a continuation-in-part of application Ser. No. 09/906,283, filed Jul. 16, 2001 now U.S. Pat. No. 6,632,140, the contents of which are incorporated herein by reference in their entireties.

FIELD OF THE INVENTION

This invention relates in general to gaming systems and processes, and more particularly to a method and apparatus for providing a gaming activity having one or more independent events in corresponding individual display segments, where the independent events randomly eliminate display segments from the gaming activity while affording collective accumulation of credits.

BACKGROUND OF THE INVENTION

Gaming devices such as slot machines have been in use in the U.S. for over a century. The earliest slot machines originally paid out in cigars and chewing gum. Remnants of the early slot machines are manifested in the traditional "fruit" symbols such as cherries, lemons, oranges, etc., which represent the original flavors of gum. Notwithstanding the similarity of the symbols and reels associated with the slot machines of both today and yesteryear, modern day slot machine implementations are markedly different than their mechanical ancestors. This dramatic implementation disparity results primarily from the advent of computers and video capabilities.

Pure chance gaming devices such as slot machines have proved wildly popular, and in recent years have rivaled and even surpassed their once untouchable table game counterparts. One reason for this popularity is the increase in innovation, and the recognition of the need for human stimulation. While true that a primary motivator for people to play gaming devices is the chance to win monetary or other prizes (in the case of legalized gambling), the intrigue and excitement of playing these newly created machines lures people as well. It is therefore important in the gaming industry that gaming innovations be rolled out to the participating public.

Conventionally, participation in slot machines involves initiating the rotation of multiple reels, and allowing the machine to randomly stop the reel rotation such that associated reel symbols line up a payline. If the symbols on that payline correspond to a predetermined symbol combination, the participant wins an amount corresponding to the particular symbol combination. For multi-lined paylines, a coin or other token may be played for any one or more of the available paylines, and each of the paylines may provide a winning payout. When this occurs, the slot machine pays out according to the payoff table posted on the slot machine. The payoff table informs players of the winning symbol combinations for that machine, and what each combination pays based on the number of coins allocated for the spin. If a winning combination occurs, the machine releases money or tokens into a payout chute, or may award the winning amount onto a credit meter for the player. For example, if a player initially wagered three coins and that player won a high payout, that player may receive fifty coins of the same denomination in return, or may receive fifty credits for continued play.

It is a continual effort in the gaming industry to develop ways to attract and captivate players in playing gaming machines, such as slot games. One such manner of stimulating interest and heightening excitement has been through the use of "bonus" events. Bonus events or games are used to attract and keep players at a gaming machine. A bonus game is typically an additional gaming reel or machine, or a random selection device, that is enabled by a bonus qualifying signal from an underlying or primary gaming machine. Generally, a predetermined prize-winning combination of symbols in an underlying or primary game may result in the player being awarded one or more bonus games. Often the bonus event has a much higher probability of winning, thereby instilling a great interest by players in being awarded bonus events.

There are various secondary or "bonus" events known in the art. One such bonus event allows the player to depress a bonus spin button to allow the player one or more additional free spins in which a winning payout may be made. Alternatively, additional, discrete bonus reels may be used for the bonus event. In such case, a particular symbol on any one or more of the reels which is stopped on a winning line may result in a winning payout. In some bonus activities, the reels may be controllable in a bonus play, unlike the underlying primary gaming play. For example, the reels may be individually stopped, and/or the reels may be rotated slower to allow the player to attempt to stop the reel such that the prize-winning symbol stops on the win line. In another example, a bonus event for a video slot machine may have a second screen where the player may be rewarded with a bonus game, such as allowing the player to pick one of five different items on the second screen, and the selected item reveals a value won by the player. In recent times, bonus events have become quite extravagant, sometimes leading the player through video animations that provide visual and audio entertainment while providing clever ways in which the participant can receive payouts of varying quantities. After engaging in the bonus event, play resumes in the underlying, primary gaming machine.

Of these different types of bonus activities, one type includes those bonus activities where the participant is allowed to actively participate in the bonus event. For example, participants may be allowed to make some sort of selection in order to make the participant feel as though he or she has in some way contributed to the ultimate result. While this may be desirable for some participants, others are more intrigued by the random nature of gaming devices, and may seek an exciting manner of engaging in bonus activities without having to figure out how to best play such a bonus round. This participant sentiment may become increasingly prevalent where the bonus activity is entirely different from the original, standard play of the game. For example, a standard slot machine may have a bonus activity where an animated series of events takes place, and the participant must try to figure out how to effectively play the bonus round. As some bonus activities become more and more elaborate, some participants may be put off by the inherent complexities.

Another problem with prior art bonus activities is that there is conventionally an understood "end" of the bonus activity that is sure to occur. For example, in a bonus round where a participant is allowed to select six of twenty-four hidden bonus amounts, the bonus round ends when the amounts associated with the six selections have been made and credited to the participant. While it may be exciting for the participant to engage in such a bonus round, it is largely due to the participant's knowledge that the bonus round is likely to produce greater payout amounts than during standard play. However, it would be desirable in the gaming industry to provide bonus activity that is terminated based on random events, where although statistically bound, can theoretically continue indefinitely.

The present invention recognizes the strong appeal of bonus activities in today's gaming industry, and addresses the aforementioned and other concerns and shortcomings of present bonus activities. The present invention provides gaming participants with an intelligible gaming bonus activity, while providing an exciting, visually-appealing activity having a theoretically unlimited potential for credit accumulations.

BRIEF DESCRIPTION OF THE DRAWINGS

The invention is described in connection with the embodiments illustrated in the following diagrams.

FIGS. 1-A through 1-J illustrate a sequence of events carried out in connection with a slot game in accordance with one embodiment of the invention;

FIG. 1-J illustrates an example where the eliminated display segments retain an image of the stop-bonus symbol that brought about the respective display segment's elimination;

FIGS. 9-A and 9-B illustrate a sequence of events carried out in connection with a slot machine in accordance with one embodiment of the invention employing display segment expiration;

FIGS. 10-A, 10-B, and 10-C illustrate representative embodiments where the gaming participant is afforded an opportunity to make a selection that ultimately identifies the expiration parameters that a particular display segment(s) will be subject to;

SUMMARY OF THE INVENTION

Figure 2:
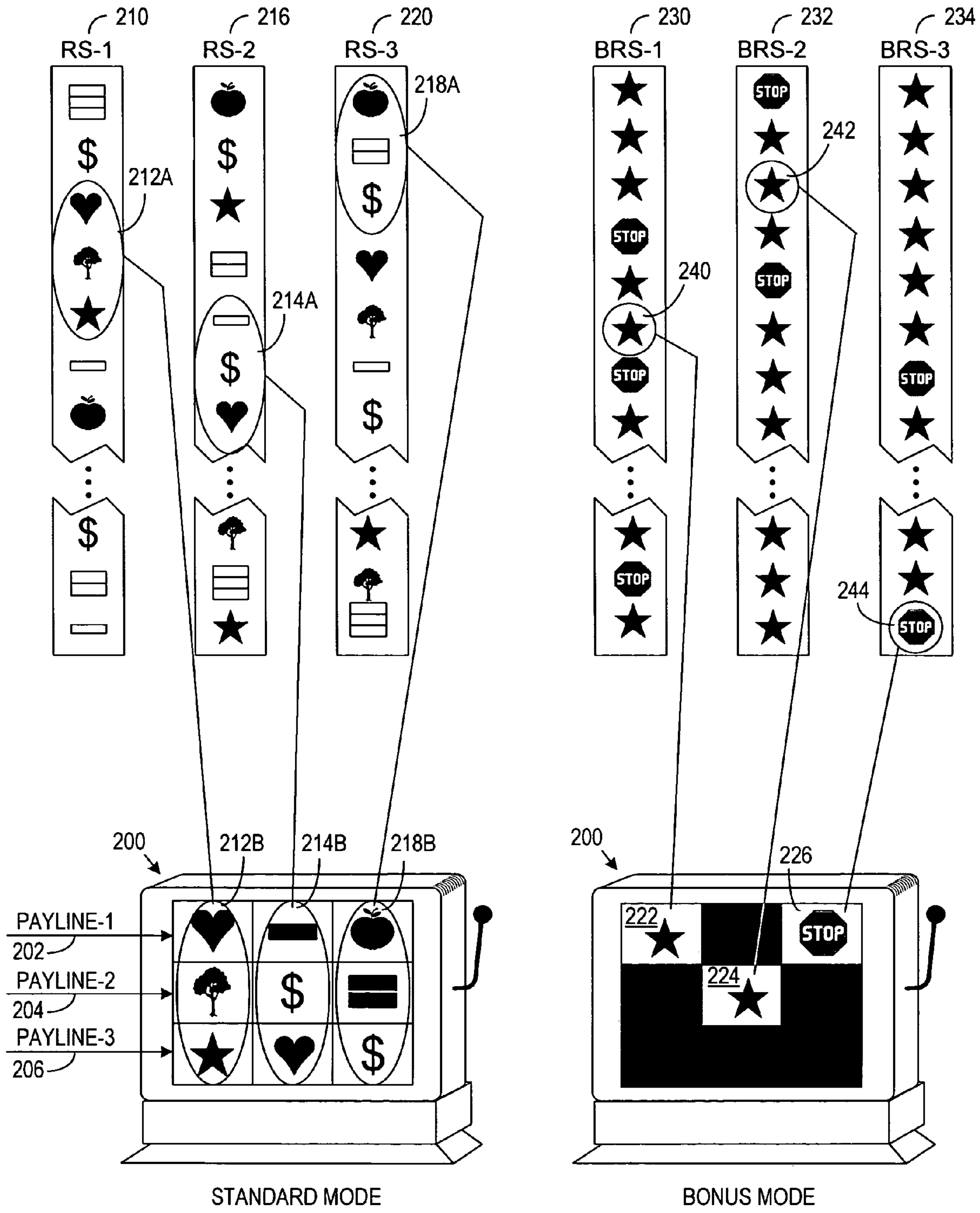
FIG. 2 is a block diagram illustrating one embodiment in which physical or virtual reel strips are associated with a slot game in the standard and bonus modes in accordance with the invention.

To overcome limitations in the prior art described above, and to overcome other limitations that will become apparent upon reading and understanding the present specification, the present invention discloses a system, apparatus, and method for providing a gaming activity having one or more independent events in corresponding individual display segments, where the independent events randomly eliminate display segments from the gaming activity while affording collective accumulation of credits.

Generally, the present invention is directed to a method and apparatus for facilitating participation in a slot game, such as that played on a slot machine or other computing device. Certain display segments of a display grid or mechanical arrangement are continually eliminated from the slot game event, by becoming associated with a predetermined one or more discontinue symbols. Those display segments that are not eliminated in this fashion continue to remain active, and potentially accumulate credits, until they too are eliminated from the slot game event.

In accordance with another aspect of the invention, the invention is generally directed to a gaming method and apparatus where certain display segments are continually eliminated from the slot game event through their expiration in response to a randomly-selected expiration parameter. Those display segments that have not expired in this fashion continue to remain active, and potentially accumulate credits, until they too have expired.

In accordance with one embodiment, the display segments are provided electronically, whereas in another embodiment the display segments are represented by a reel, wheel, or other rotatable shape. Various electronic embodiments are first described, and various mechanical embodiments are subsequently described.

Embodiments of the present invention are directed to methods that involve presenting a display grid with two or more grid positions to a game player. One or more grid positions of the plurality of grid positions are indicated as active grid positions. Winning results are determined using only the active grid positions. One or more active grid positions are then repeatedly identified for deactivation between game plays, and subsequently deactivated, until all active grid positions are deactivated.

Methods may further involve randomly changing the symbols associated with the active grid positions between repetitions, and identifying an active grid element for deactivation in response to a discontinue symbol, such as a stop symbol or other terminate signal. Deactivating the one or more identified active grid positions may involve obscuring the grid position. Symbols associated with the active grid positions may be changed between repetitions, wherein deactivated grid positions may retain their current symbol. The display grid may include symbols of a mechanical reel arrangement, and indicating one or more grid positions as active may involve distinguishing the positions of the presented symbols from the positions of the remaining positions of the mechanical reel arrangement. The display grid may also be an electronic display grid, wherein indicating one or more grid positions as active involves visually obscuring the deactivated grid positions.

Embodiments of devices in accordance with the present invention include a casino gaming apparatus hosting a gaming activity having at least a standard mode of operation and a bonus mode of operation. The casino gaming apparatus may include a display grid having two or more grid positions with a user interface to facilitate player participation in at least the standard mode of operation. A processor may be configured to enter a bonus mode of operation in response to a predetermined symbol combination occurring during the standard mode of operation, and during the bonus mode of operation to indicate one or more grid positions of the plurality of grid positions as active grid positions. Winning results are determined using only the indicated active grid positions. Identification of one or more active grid positions for deactivation is repeated, and the one or more identified active grid positions are subsequently deactivated until all active grid positions are deactivated, ending the bonus round of play. The processor may include a random number generator configured to randomly select the symbols for presentation in the active grid positions. The casino gaming apparatus may be configured as a slot machine, and the standard mode of operation of the slot machine is a slot game. Other embodiments include poker games, bingo games, keno games, or other games.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

DETAILED DESCRIPTION OF THE ILLUSTRATED EMBODIMENTS

In the following description of the invention, reference is made to the accompanying drawings that form a part hereof, and in which are shown by way of illustration the particular embodiments in which the invention may be practiced. It is to be understood that other embodiments may be utilized, as structural and operational changes may be made without departing from the scope of the present invention.

Generally, the present invention is directed to a method and apparatus for facilitating participation in a slot game, such as that played on a slot machine or other computing device. Certain display segments of a display grid or mechanical arrangement are continually eliminated from the slot game event, by becoming associated with a predetermined one or more discontinue symbols. Those display segments that are not eliminated in this fashion continue to remain active, and potentially accumulate credits, until they too are eliminated from the slot game event.

In accordance with another aspect of the invention, a gaming method and apparatus provide certain display segments that are continually eliminated from the slot game event through their expiration in response to a randomly-selected expiration parameter. Those display segments that have not expired in this fashion continue to remain active, and potentially accumulate credits, until they too have expired.

In accordance with one embodiment, the display segments are provided electronically, whereas in another embodiment the display segments are represented by a reel, wheel, or other rotatable shape. Various electronic embodiments are first described, and various mechanical embodiments are subsequently described.

The present invention, as described more fully below, may be applicable to a variety of gaming activities that are played on a gaming machine, including slot games such as reel slots and video slots, electronic poker and other electronic card games, keno, bingo, craps, dice, roulette, etc. The present invention is, however, described in large part in the present description in terms of slot machines to provide an understanding of the invention. For example, in the context of slot games/machines, the present invention allows slot game participants to partake in a standard slot game, while having the opportunity to become engaged in a bonus activity according to the present invention. While the invention may be particularly advantageous in the context of slot machines, and while a description in terms of slot machines facilitates an understanding of the invention, the invention is equally applicable to other gaming activities of chance as will be readily apparent to those of skill in the art from the description provided herein.

More particularly, an exemplary gaming system in which the principles of the present invention are particularly beneficial includes at least one standard gaming activity, and at least one bonus activity. For example, in the context of slot machines, a standard gaming activity includes the normal slot game in which the participant places a wager, initiates spinning the slot game reels, and collects payouts upon the occurrence of one of two or more predetermined winning symbol combinations. A bonus activity is an activity different from the standard gaming activity, which generally only occurs at certain times. In other words, where the standard gaming activity is the gaming activity that is presented to the participant automatically in connection with play of the gaming device, a bonus activity is not automatically presented to the participant. Rather, the bonus activity is generally a special occurrence awarded to the participant for an occurrence resulting from standard gaming play. For example, a bonus event may be awarded to a slot game participant if a resulting symbol combination occurring during standard slot game activity corresponds to a symbol combination determined in advance to result in a bonus event award.

Bonus events are typically used to attract and keep players at a gaming machine, and are typically an additional game or machine, or a random selection device, that may be enabled by a bonus qualifying signal from an underlying or primary gaming activity. Generally, a predetermined combination of symbols in an underlying game may result in the player being awarded one or more bonus games. Often the bonus event has a much higher probability of winning, thereby instilling a great interest by players in being awarded bonus events.

As is described more fully below, the present invention provides a repeated bonus activity that, over time, statistically diminishes in potential payout opportunities through individual display segment elimination from the bonus activity. It should be recognized, however, that the principles of the present invention may be utilized in a standard mode of play rather than a bonus mode of play. Those skilled in the art will readily appreciate that the invention may be utilized in a standard mode of play from the description provided herein. While the present invention may be carried out in a standard play mode, an exemplary embodiment of the invention utilizes the present invention in a secondary, or bonus mode, and while embodiments of the invention are largely described herein in connection with such a bonus mode of operation, the invention is not limited thereto.

In order to provide an understanding of the operation of the invention, FIGS. 1-A through 1-J illustrate a sequence of events carried out in connection with a slot machine in accordance with one embodiment of the invention. FIG. 1-A illustrates an example of a slot game grid 100 that may be presented on a slot game display 102. Different slot games may exhibit a variety of different reel characteristics and display formats. For example, some slot games include a conventional three-reel configuration traditionally used in mechanical-reel slot machines. In a three-reel configuration, three reels each having an associated reel strip of symbols rotate vertically as viewed by the participant. The reels stop at random locations, thereby presenting the participant with one, two, or three paylines of potentially winning symbol combinations, depending on the amount wagered by the participant. In more recent times, this traditional reel display format has changed significantly, largely due to the ability to present electronic reels on a display screen. This has resulted in a variety of different reel formats, including greater quantities of vertically rotating electronic reels, greater numbers of paylines, and paylines that include vertical, diagonal, as well as the traditional horizontal paylines. The present invention is applicable with any reel configuration. Therefore, the slot game grid 100 of FIG. 1-A is shown as having an indeterminate number of rows and columns, which can accordingly represent an indeterminate number of reels, paylines, and the like.

The slot game grid 100 of FIG. 1-A includes a number of rows, which may represent different paylines. However, as will be described more fully below, rows do not necessarily correspond to paylines in accordance with the present invention. Each row includes one or more display segments. The first row includes display segments 110, 112, 114, through some predetermined number of display segments represented by display segment 118. Similarly, a second row includes display segments 120, 122, 124 through 128, and a third row includes display segments 130, 132, 134 through 138. Depending on the number of display segments, rows, paylines, etc. desired, additional rows through the final row are provided, where the final row includes display segments 140, 142, 144 through 148. Thus, FIG. 1-A is intended to represent a generic slot game grid having any number or combination of display segments.

Referring now to FIG. 1-B, the slot game grid 100 presented on the display 102 illustrates how symbols ultimately correspond to the display segments. For example, the slot game state represented in FIG. 1-B may include at least four rotating reels (e.g., virtual reels), including the reels corresponding to columns 150, 152, 154 through 158. When the reels randomly come to a stop in accordance with a standard mode of slot game play, slot game symbols are presented in each of the display segments as shown in FIG. 1-B. In some instances, the "symbol" may be a blank symbol as shown in display segments 112 and 128. Each of the various rows 160, 162, 164 through 168 may represent various paylines, where a predetermined combination of symbols in any of the paylines may produce a winning combination and payout during the standard mode of play. Paylines may also be provided in other manners, such as vertically through columns 150, 152, 154 through 158 (particularly where each of the symbols in such columns are not in a predetermined reel strip configuration). Paylines may also be made diagonally, or in some other predetermined pattern. The particular manner in which paylines are formed during a standard mode of play is not of particular importance to the present invention.

In accordance with an exemplary embodiment of the present invention, a predetermined pattern, number of symbols, or other predetermined symbol configuration will initiate a secondary mode of play, referred to herein as a bonus mode of play. The bonus mode can be initiated by a certain symbol combination arising on any of the paylines of the slot game grid 100, or by a certain predetermined symbol combination arising anywhere on the grid 100. In the example of FIG. 1-B, a predetermined symbol combination of three cloud symbols initiates the bonus activity. These three cloud symbols are shown in display segments 114, 130, and 142. It should be noted that any predetermined symbol may initiate the bonus activity, as well as any number of such symbols arising (e.g., one, two, etc.) Again, for purposes of illustration, three cloud symbols trigger the bonus mode in the present example.

When the bonus-triggering symbols are presented during the standard mode of play, the bonus mode may be initiated. In accordance with one embodiment of the present invention, the display segments 114, 130, and 142 corresponding to the bonus-triggering symbols become the display segments to be used in the bonus activity. This can be seen in FIG. 1-C, where display segments 114, 130, and 142 remain "active," but the remaining display segments 110, 112, 118, 120, 122, 124, 128, 132, 134, 138, 140, 144, and 148 temporarily become "inactive." In one embodiment of the invention, these inactive display segments are de-emphasized during the bonus mode of play, such as by graying out these display segments or otherwise providing some other visual manner of distinguishing the inactive and active display segments.

The bonus activity according to one embodiment of the invention includes randomly or pseudo-randomly updating the active display segments 114, 130, 142 with bonus symbols that may provide the participant with credits won through the bonus activity. For example, referring to FIG. 1-D, the bonus activity includes individually re-spinning virtual reels in each of the display segments 114, 130, 142. In accordance with one embodiment of the invention, the bonus mode is automatically initiated upon the bonus-triggering event as described in connection with FIG. 1-C. Alternatively, the participant may be notified visually, audibly, or otherwise that the bonus mode is available, thereby prompting the participant to initiate the spinning of the active display segments 114, 130, 142 through a user interface.

The bonus mode according to embodiments of the invention utilizes a random number generator (RNG) to randomly (or pseudo-randomly) determine which bonus symbols will be presented in the display segments 114, 130, 142 during the bonus activity. The degree in which the symbols are selected "randomly" may be configured as desired, such as by controlling the degree in which the symbol is randomly selected through desired statistical probability outcomes. FIG. 1-E illustrates the display segments 114, 130, 142 after the display segment "spinning" is stopped pursuant to the RNG. The ultimately resulting symbols that are randomly presented in each of these active display segments may be common to the symbols used during the standard mode of play, or alternatively may be a different set of symbols used just during the bonus mode of play. In the illustrated embodiment, the bonus symbols are different than those used in the standard mode of play, and include a termination symbol(s) or stop-bonus symbols, such as the stop-sign symbol in display segment 130, as well as continue-bonus and/or re-spin symbols such as the star symbols in display segments 114 and 142.

The continue-bonus symbols associated with display segments 114 and 142 result in continued bonus activity at these display segments. An amount value, corresponding to a number of coins or credits won, may be displayed in connection with the continue-bonus symbols. For example, the star continue-bonus symbol at display segment 114 indicates that one hundred credits were randomly awarded, and the star continue-bonus symbol at the display segment 142 indicates that twenty-five credits were awarded. Thus, this particular bonus round of the entire bonus activity resulted in a total of one hundred and twenty-five credits being awarded to the participant. The continue-bonus symbols may be associated with positive credit/coin awards, i.e., a credit award greater than zero. Alternatively, the continue-bonus symbols may be associated with no credits/coins (i.e., a null credit award), but that display segment will remain active for further bonus activity. In another embodiment, the continue-bonus symbols may even be associated with negative credits, such that credit accumulations are taken away from the participant, although the display segment will remain active for anticipated further credit accumulations. In still further embodiments, multiple matching continue-bonus symbols may be required in order to obtain a particular credit value.

Each time a continue-bonus symbol is presented during the bonus activity, whether or not associated with a credit/coin award, the corresponding display segment remains active, resulting in further chances to accumulate credits/coins via that display segment. On the other hand, stop-bonus symbols such as the stop symbol in display segment 130 are deactivated, and therefore eliminated from further activity during this particular round of play. As will be described in greater detail, the bonus mode according to embodiments of the present invention may theoretically continue indefinitely, as the random selection of continue-bonus symbols can repeatedly be presented in the display segments during the bonus mode. Thus, there may be no scheduled end to the bonus round, but rather, the bonus activity ends when all or a predetermined number of the active display segments have been eliminated from the bonus round through deactivation of the corresponding display segments upon random receipt of a stop-bonus (i.e., discontinue) symbol. This is described in greater detail in FIGS. 1-F through 1-J below.

Referring next to FIG. 1-F, the non-eliminated, active display segments 114, 142 re-spin due to a continue-bonus symbol having been previously associated with these display segments. Display segment 130, on the other hand, has been de-emphasized due to its earlier elimination resulting from the stop-bonus symbol being presented in display segment 130. It should be noted that in one embodiment of the invention, one or more of the active display segments 114, 142 having a continue-bonus symbol may be "held" for use in the next spin.

Upon completion of the spinning of the remaining display segments 114, 142, a random symbol presentation is presented in the active display segments 114, 142 as shown in FIG. 1-G. In this example, the ultimately resulting bonus symbols that are randomly presented in these active display segments include a continue-bonus symbol (e.g., star symbol) in display segment 114, and a stop-bonus symbol (e.g., stop-sign symbol) in display segment 142. In the illustrated example, the continue-bonus symbol at display segment 114 has an associated credit award of fifty credits, thereby adding an additional fifty credits to the participant's accumulated credit total. As previously described, display segment 114 remains active for further bonus activity due to its association with a continue-bonus symbol. On the other hand, the stop-bonus symbol associated with display segment 142 results in display segment 142 being deactivated and eliminated from further bonus activity. It should be recognized that stop-bonus symbols, as with continue-bonus symbols, may be associated with a credit award even though the associated display segment is eliminated from further involvement with that particular bonus activity.

This process of repeatedly eliminating the availability of display segments during the bonus activity continues, as shown in FIG. 1-H. FIG. 1-H shows that the remaining active display segments, display segment 114 in this example, again provide a random selection process of a new bonus symbol, as illustrated by the display segment spinning action of display segment 114. The previously-eliminated display segment 142 is optionally de-emphasized. When a bonus symbol has been randomly selected, it is presented in display segment 114 as shown in FIG. 1-I. In this example, the bonus symbol is, by random chance, a stop-bonus symbol. However, the symbol could have been a continue-bonus symbol, thereby awarding the participant with any associated credit value, and maintaining the display segment 114 as an active display segment. Because of the random nature of the presentation of continue-bonus and stop-bonus symbols, the bonus activity has no set termination. However, in other embodiments of the invention, a maximum number of spins or other termination point may be defined.

The display segments that have been eliminated from the bonus activity may be, as previously described, de-emphasized, as the original inactive display segments were. Alternatively, the display segments that have been eliminated from the bonus activity may retain a visual cue to identify that display segment as a once-active display segment associated with the bonus activity. FIG. 1-J illustrates such an example, where the elimination of display segments 130, 142 retain an image of the stop-bonus symbol that brought about the respective display segment's elimination. Other images can alternatively be provided in these eliminated display segments as well.

It should be noted that any predetermined number of symbols, in any predetermined arrangement, may be used to initiate the bonus activity in accordance with the invention. Further, an exemplary embodiment of the invention utilizes the same display segments for purposes of the bonus round that initially gave rise to the bonus round. For example, display segments 114, 130, and 142 initially gave rise to the bonus round in the example of FIGS. 1-A through 1-I, and these same display segments were therefore used in the bonus activity. Alternatively, a different display segment arrangement could be used for the bonus round, but implementing the repeated elimination process described above. Thus, once the bonus activity is initiated, any predetermined arrangement and/or number of display segments could be used in the elimination bonus activity described herein. For example, even where the display segments 114, 130, 142 originally give rise to the bonus activity, an alternative embodiment includes utilizing, for example, the top row 160 of the slot game grid as the relevant display segments.

In one embodiment of the invention, the standard mode of play may implement a first set of physical or electronic (e.g., virtual) reel strips, and the bonus mode of play may implement a different set of reel strips, where each reel strip provides a symbol set. Further, the standard mode of play may implement physical or virtual reel strips where multiple sequential symbols of the reel strip is provided on multiple paylines during the standard mode of play. For example, referring to FIG. 2, a slot machine 200 is shown in the standard mode of play. In this example, the standard mode includes three paylines, shown as payline-1 202, payline-2 204, and payline-3 206. The reel strips associated with the standard mode of play may be provided as physical strips having symbols imprinted thereon, such that the stopping point of the reel strip determines which symbols will fall on the paylines 202, 204, 206. For example, a first reel strip, RS-1 210 includes a series of symbols. This reel strip, when stopped, presents a group of symbols on the paylines 202, 204, 206. More particularly, the symbol group 212A is presented across payline-1 202, payline-2 204, and payline-3 206 as seen on the slot machine 200 as symbol group 212B. Analogously, the symbol group 214A of RS-2 216 is presented across paylines 202, 204, 206 as symbol group 214B on the slot machine 200; and the symbol group 218A of RS-3 220 is presented across paylines 202, 204, 206 as symbol group 218B on the slot machine 200. The same may hold true for virtual reel strips, where the order of the symbols on the virtual reel strip may be carried over to the order of the symbols presented across the paylines.

The operation of the reel strips, whether physical or virtual, may change in accordance with one embodiment of the invention. As shown in FIG. 2, the slot machine 200 de-emphasizes those display segments that are not "active" when entering the bonus mode of play. Three display segments 222, 224, and 226 remain active in this example. The same reel strips used during standard play may be used in the bonus mode, however, in the illustrated embodiment a new set of bonus reel strips BRS-1 230, BRS-2 232, and BRS-3 234 are used. In the bonus mode, one embodiment of the invention involves providing a reel strip 230, 232, 234 for each of the individual display segments 222, 224, 226 that is active in the bonus mode of play. Thus, bonus reel strip BRS-1 230 will "spin" in display segment 222, bonus reel strip BRS-2 232 will spin in display segment 224, and bonus reel strip BRS-3 234 will spin in display segment 226. In this manner, each of the individual active display segments 222, 224, 226 operates as a discrete, self-sufficient bonus payline. As can be seen, a single symbol such as continue-bonus symbols 240 and 242 from bonus reel strips 230 and 232 respectively may ultimately be presented in display segments 222 and 224. Similarly, a stop-bonus symbol 244 from bonus reel strip 234 may ultimately be presented in display segment 226.

It should be noted that the particular reel strips, number of symbols, and type of symbols presented on the reel strips 230, 232, 234 may differ from one embodiment to the next. For example, each of the reel strips can include a different symbol set altogether, rather than having symbols from a common symbol set such as illustrated in FIG. 2. Further, the symbols associated with any of the reel strips may change. For example, after each "spin" in the bonus mode one or more of the reel strips can change symbols, add symbols, remove symbols, etc. In a more particular example, each time a display segment has a continue-bonus symbol associated therewith, one or more of the continue-bonus symbols on that reel strip may be removed, to raise the chance that a stop-bonus symbol will occur.

During bonus mode, the active display segments, such as display segments 222, 224, and 226, thus operate as individual paylines in one embodiment of the invention. In alternative embodiments, two or more active display segments may present symbols from a common reel strip. For example, in the case of electronic reel strips requiring no physical relationship between the symbols, the single bonus reel strip 230 may provide the symbols for each of the display segments 222, 224, and 226 during the bonus activity. However, in such case, each of the active display segments 222, 224, 226 would appear, and spin, as individual paylines. Therefore, such an embodiment is best suited for video display segments where the reel strip is a "virtual" reel strip generated electronically, and therefore does not require an actual, physical reel strip.

As described above, one embodiment of the invention involves operating each of the "active" display segments individually such that the resulting symbol in each active display segment is not reliant on symbols in other display segments to determine a winning result. For example, a star symbol in active display segment 222 by itself may generate a winning payout, where the stop symbol in active display segment 226 by itself may cause that particular display segment to be eliminated from the bonus activity. In such an embodiment, the symbol presented in the active display segment provides all the information necessary to determine whether that display segment will continue to be active, whether it will provide a payout amount, or whether that display segment will become inactive due to its elimination. Other actions may also be taken from these single symbols, as different symbols may represent different actions. One such example is that a certain symbol causes an auxiliary action, such as doubling the payout of another continue-symbol in another display element presented during bonus mode, enabling a new display element to become part of the bonus activity, or other auxiliary action.

Although the active display elements operate as individual paylines, the collection of active display elements create a "bonus group" of active display elements. The active display elements 222, 224, and 226 may thus be considered as an active bonus group, which remains operative in the bonus mode of play until all of the individual display segments of the bonus group have been eliminated.

FIGS. 3-A and 3-B provide a more particular example of the elimination bonus methodology in accordance with the invention. In this example, a video display screen 300 is provided. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

The display screen of the illustrated embodiment includes a grid 301 including a plurality of video display segments. In one embodiment, the grid includes five virtual reels 302, 304, 306, 308, and 310 that rotate vertically. However, in a video display environment, the electronic reels need not rotate vertically, but may rotate horizontally along rows, or each display segment may rotate independently of other display segments. In this example it is assumed that the electronic reels rotate vertically and in groups defined by reels 302, 304, 306, 308, and 310.

In the standard mode of play, the reels 302, 304, 306, 308, and 310 are electronically rotated. The reels are randomly stopped pursuant to operation of a random number generator (RNG) or other random operation engine. Winning symbol combinations may be presented along a number of different paylines. The example of FIG. 3A includes five paylines, shown as payline-1 320, payline-2 322, payline-3 324, payline-4 326, and payline-5 328. Additional paylines could be implemented, such as along columns, particularly where the standard mode of play randomly selects symbols at each display segment rather than providing a continuous reel strip for each column. In this example, payline-1 320 includes display segments 330, 332, 334, 336, and 338. Payline-2 322 includes display segments 340, 342, 344, 346, and 348. Payline-3 324 includes display segments 350, 352, 354, 356, and 358. Payline-4 326 includes display segments 330, 342, 354, 346, and 338. Finally, payline-5 328 includes display segments 350, 342, 334, 346, and 358.

While the participant may win credits by obtaining predetermined symbol combinations along paylines 320, 322, 324,

326, 328 during the standard mode of play, the present invention also includes a bonus mode of play. Any predetermined symbol criteria may be used to invoke the bonus mode of play. For example, the criteria may be one or more predetermined symbols stopping at predetermined locations in the display segment grid 301. An example is at least one predetermined symbol stopping in each of the reels 302, 304, 306, 308, 310. Another exemplary criteria requires a predetermined number of a predetermined symbol, regardless of where on the grid 301 these predetermined symbols present themselves. For example, the criteria may be that three star symbols present themselves on the grid 301, and if at least three star symbols present themselves, they become the "bonus group" used in the bonus mode of play. As will be readily apparent to those skilled in the art from the foregoing description, a wide variety of options may be implemented to invoke the bonus mode in accordance with the invention.

Figure 3A:
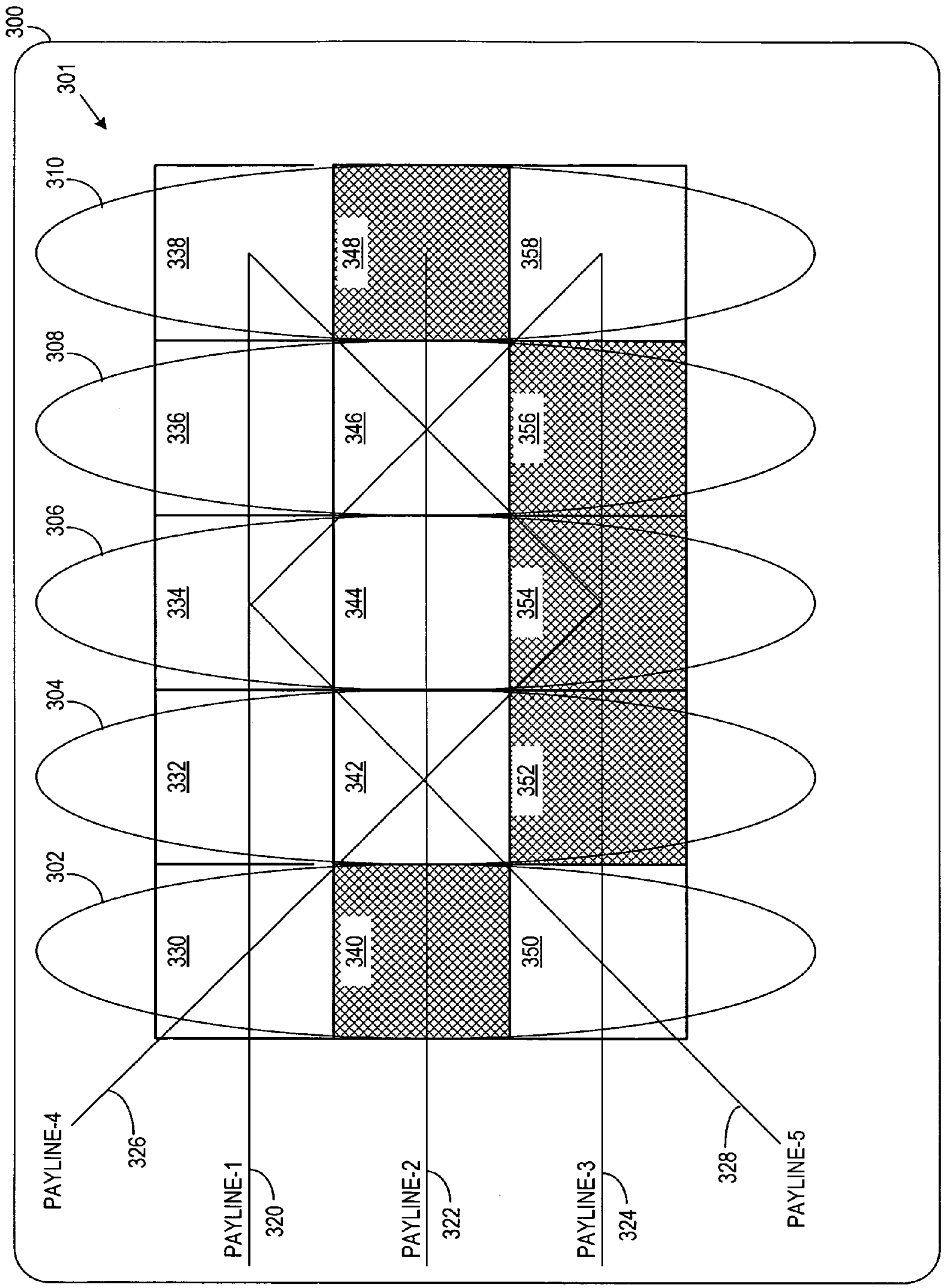
FIGS. 3-A and 3-B illustrate an exemplary embodiment of the elimination bonus methodology used in connection with a video display device in accordance with embodiments of the invention.

For purposes of discussion, it is assumed that the criteria used in invoke the bonus mode is that a predetermined symbol must present itself in each of the reels 302, 304, 306, 308, 310. The example of FIG. 3A illustrates that such predetermined symbols presented themselves during standard play at display segments 340, 352, 354, 356, and 348. This invokes the bonus mode of play.

Figure 3B:
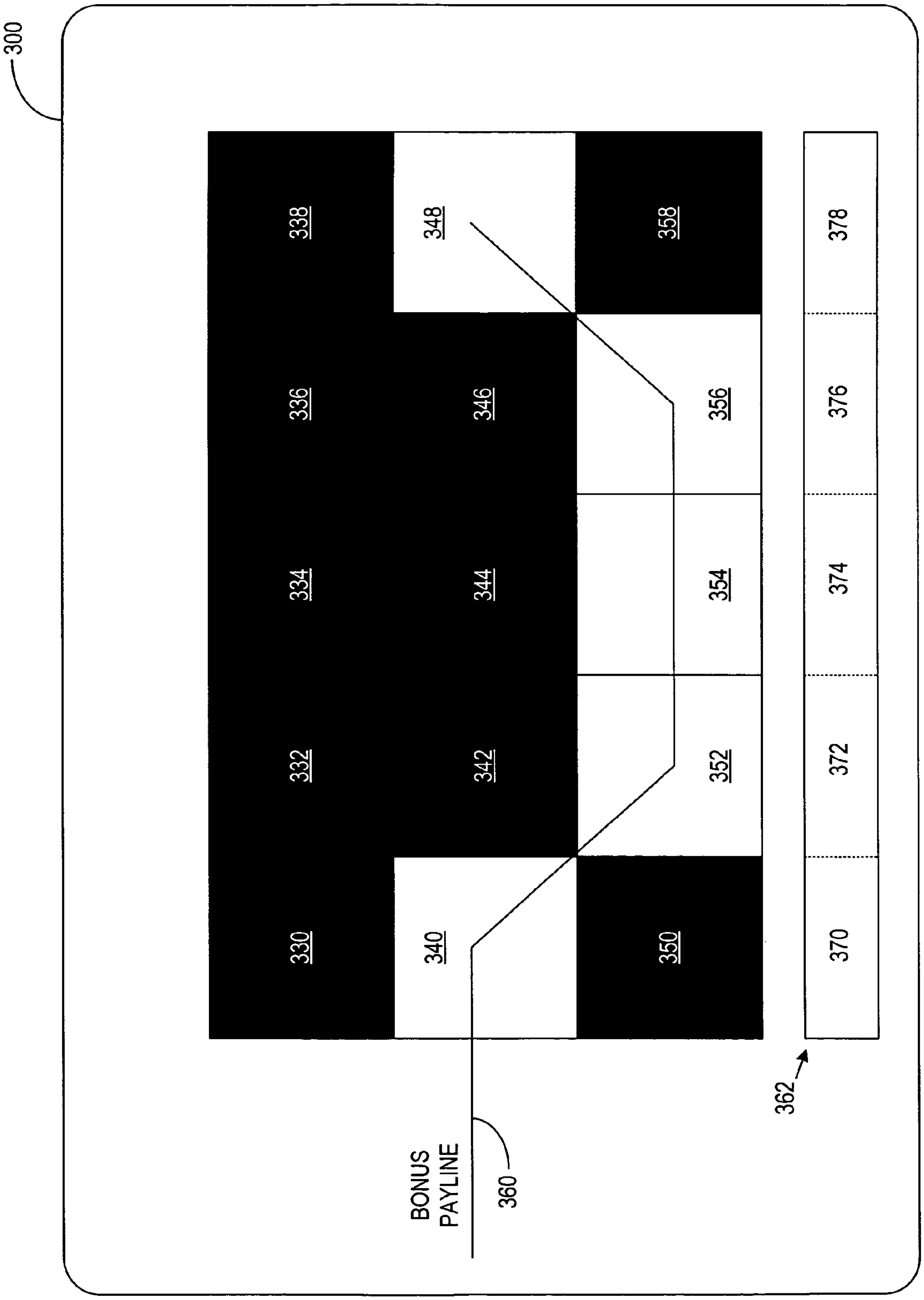

FIG. 3B illustrates an exemplary embodiment of the display screen 300 when the bonus mode is invoked. In this embodiment, all display segments 340, 352, 354, 356, 348 in which the predetermined symbol was presented during standard play become the active display segments of the bonus group 360 in the bonus mode of play. In one embodiment, the remaining display segments are de-emphasized or otherwise distinguished from the bonus group as shown in FIG. 3B. At this point, the bonus activity may automatically begin, or alternatively may be initiated by the participant via a user interface. The bonus activity then continues as previously described in connection with FIGS. 1-A through 1-I.

The display screen 300 also includes a bonus payout bar 362. The bonus payout bar 362 provides payout subtotals of predetermined active display segments of the bonus group 360. In the illustrated example, the bonus payout bar 362 is configured to provide payout subtotals for each active display segment, such that bonus payout bar sections 370, 372, 374, 376, and 378 provide subtotal payout accumulations for display segments 340, 352, 354, 356, and 348 respectively. For example, if display segment 340 produces three continue-bonus symbols each having a payout value of twenty-five during three rounds of bonus activity, the bonus payout bar section 370 will reflect a subtotal accumulation of seventy-five credits. This subtotal accumulation will continue until each of the display segments of the entire bonus group has been eliminated through stop-bonus symbols.

Figure 4:
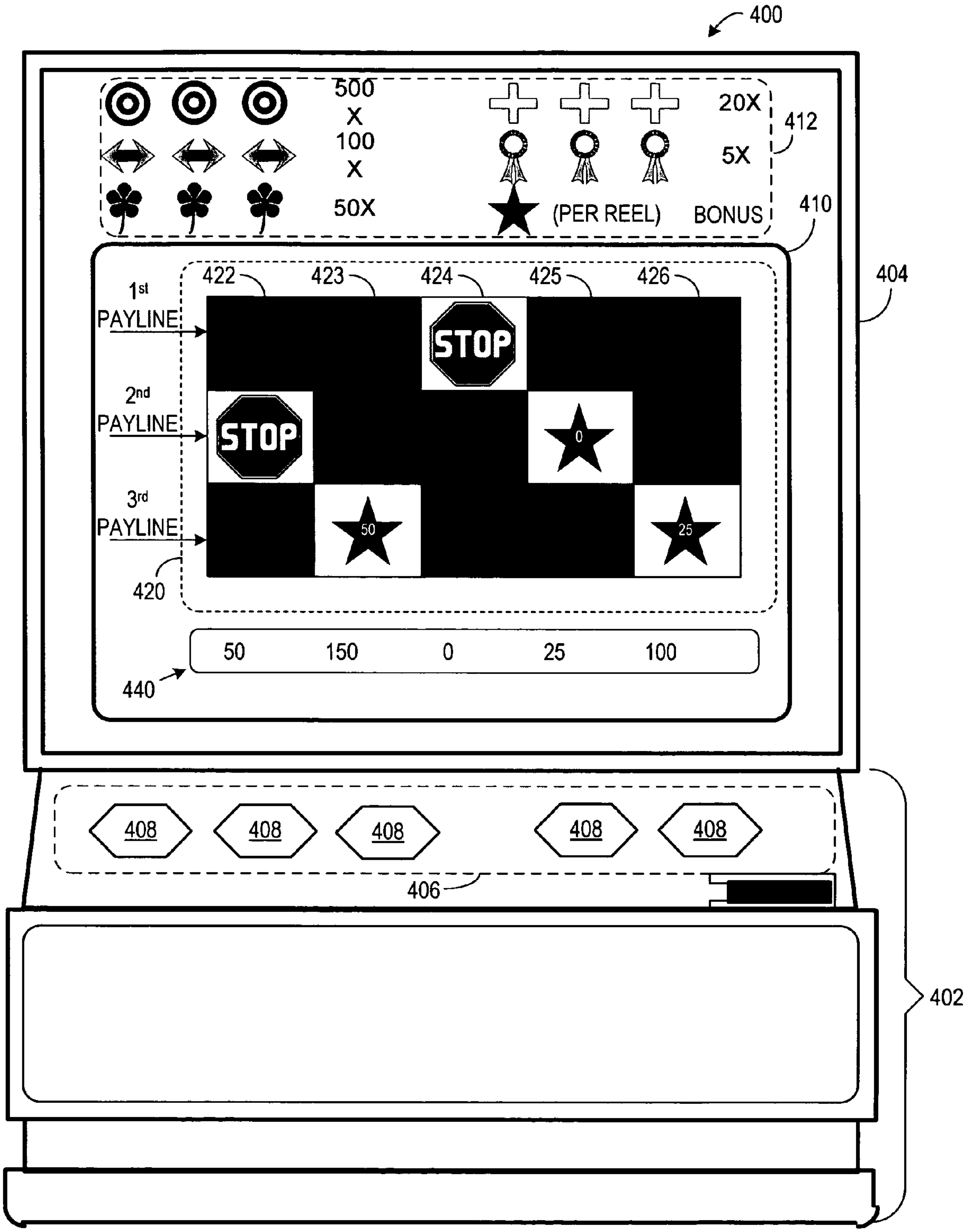
FIG. 4 is an embodiment of a casino-style gaming device in which the principles of the present invention may be applied.

FIG. 4 is an embodiment of a casino-style gaming device in which the principles of the present invention may be applied. Many traditional casino table games may be provided in a "video game" available via a casino-style gaming device shown in FIG. 4. For purposes of explanation, the description of the gaming device is FIG. 4 is provided in terms of a slot machine 400. However, the present invention is analogously applicable to other casino-style games having the ability to include at least one bonus activity.

The slot machine 400 is a structure including at least a computing system, a housing, and a display. The housing includes a base 402 and a display device 404 to allow the slot machine 400 to be a self-supported, independent structure. The base 402 includes structure supporting the slot machine 400, and also includes a user interface 406 to allow the user to control and engage in play of the slot machine 400. The particular user interface mechanisms associated with user interface 406 is dependent on the type of gaming machine. For example, the user interface 406 may include one or more buttons, switches, joysticks, levers, pull-down handles, track-balls, voice-activated input, or any other user input system or mechanism that allows the user to play the particular gaming activity. The user input 406 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 406 that the user can initiate the standard mode of play, and may optionally control certain aspects of the bonus mode of play. In the case of a slot machine, the user input may include a plurality of buttons, e.g., button 408, which allow the user to enter a number of credits to play, identify the number of paylines in which to participate, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, or other known user entry methodology. The particular user interface mechanism employed is not relevant to the present invention.

The display device 404 includes a display screen 410. The display device may take on a variety of forms depending on what type of presentation is to be provided. For example, a slot game area 420 is provided where the standard slot gaming activity is displayed. In this example, the standard slot gaming activity includes five video reels 422, 423, 424, 425, and 426, and three paylines depicted as the $1^{st}$ payline 428, the $2^{nd}$ payline 430, and the $3^{rd}$ payline 432. The display segments occur at the intersections of each video reel and payline. Another presentation that may be displayed on the display screen 410 is the bonus payout bar 440, which may optionally be displayed only during the bonus mode of play.

Also associated with the display device 404 is an optional pay table or winning guide area 412, where information associated with the potential winning symbol combinations of the standard slot game activity may be presented. This area may also provide an indication of the requisite symbols, symbol combinations, symbol locations, etc. that are required to invoke the bonus mode in accordance with the invention. This information may be part of the display screen 410, or alternatively may be separate from the display screen 410 and provided directly on a portion of the display device 404 structure itself. For example, a backlit colored panel may be used as the winning guide area 412.

Figure 5:
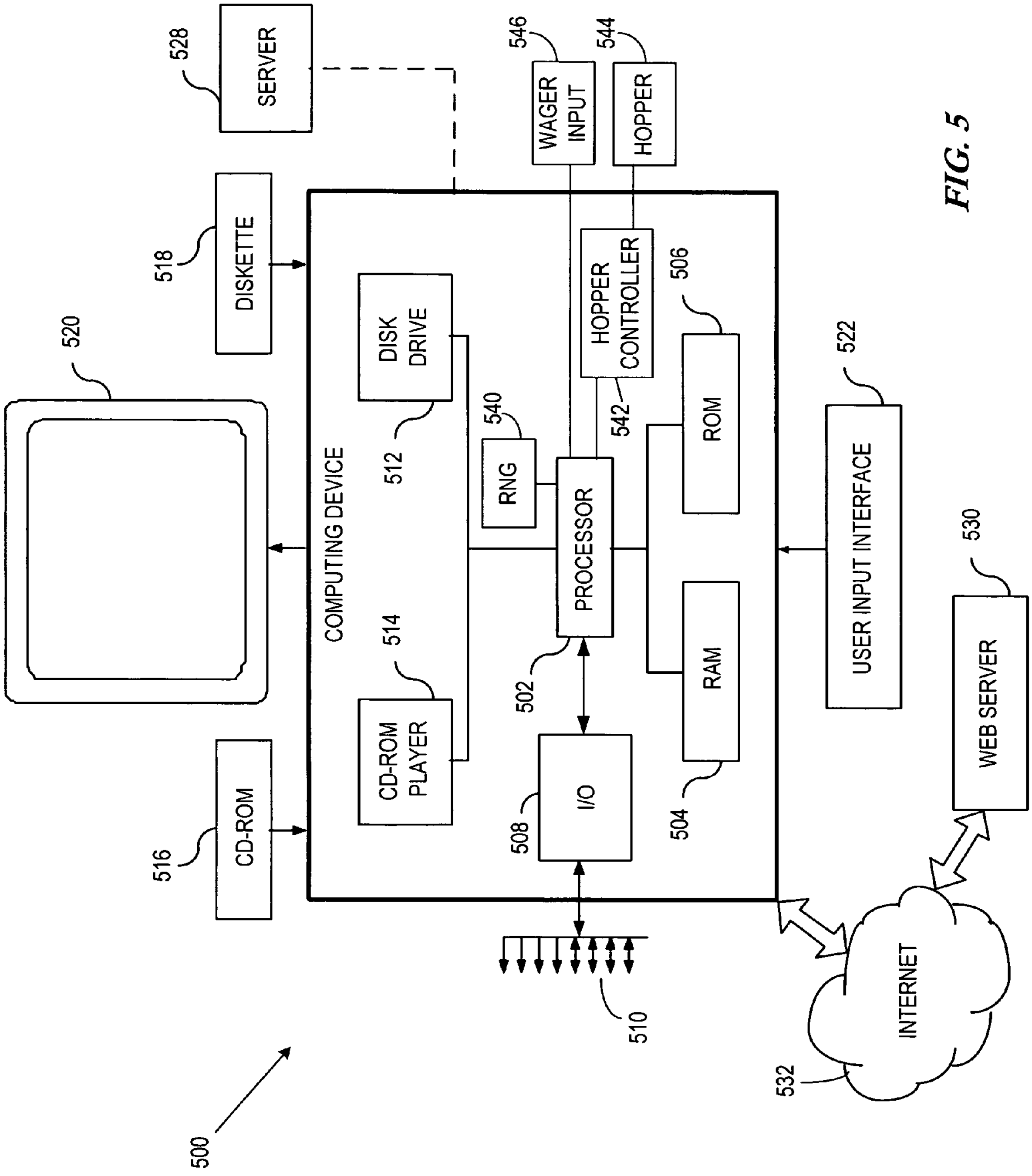
FIG. 5 is a block diagram of a representative computing system capable of carrying out operations in accordance with embodiments of the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 5.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 500 of FIG. 5 is an example computing structure that can be used in connection with such electronic gaming machines, computers, or other computer-implemented devices to carry out operations of the present invention.

The example computing arrangement 500 suitable for performing the gaming and bonus group elimination functions in accordance with the present invention typically includes a central processor (CPU) 502 coupled to random access memory (RAM) 504 and some variation of read-only memory (ROM) 506. The ROM 506 may also be other types of storage media to store programs, such as programmable ROM (PROM), erasable PROM (EPROM), etc. The processor 502 may communicate with other internal and external components through input/output (I/O) circuitry 508 and bussing 510, to provide control signals, communication signals, and the like.

Chance-based gaming systems such as slot machines, in which the present invention is applicable, are governed by random numbers and processors. Electronic reels are used to display the result of the digital reels, which are actually stored in computer memory and "spun" by a random number generator (RNG). RNGs are well known in the art, and may be implemented using hardware, software operable in connection with the processor 502, or some combination of hardware and software. In accordance with generally known technology in the field of slot machines, the processor 502 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 520. The present invention is operable using any known RNG, and may be integrally programmed as part of the processor 502 operation, or alternatively may be a separate RNG controller 540. RNGs are well known in the art, and any type of RNG may be implemented for the standard mode of play and/or the bonus mode of play in accordance with the invention.

The computing arrangement 500 may also include one or more data storage devices, including hard and floppy disk drives 512, CD-ROM drives 514, and other hardware capable of reading and/or storing information such as DVD, etc. In one embodiment, software for carrying out the standard and bonus gaming operations in accordance with the present invention may be stored and distributed on a CD-ROM 516, diskette 518 or other form of media capable of portably storing information. These storage media may be inserted into, and read by, devices such as the CD-ROM drive 514, the disk drive 512, etc. The software may also be transmitted to the computing arrangement 500 via data signals, such as being downloaded electronically via a network, such as the Internet. Further, as previously described, the software for carrying out the functions associated with the present invention may alternatively be stored in internal memory/storage of the computing device 500, such as in the ROM 506. The computing arrangement 500 is coupled to the display 520, which represents a display on which the gaming activities in accordance with the invention are presented. The display 520 merely represents the "presentation" of the video information in accordance with the invention, and may be any type of known display or presentation screen, such as LCD displays, plasma display, cathode ray tubes (CRT), etc. Where the computing device 500 represents a stand-alone or networked computer, the display 520 may represent a standard computer terminal or display capable of displaying multiple windows, frames, etc. Where the computing device is embedded within an electronic gaming machine, such as slot machine 400 of FIG. 4, the display 520 corresponds to the display screen 410 of FIG. 4. A user input interface 522 such as a mouse or keyboard may be provided where the computing device 500 is associated with a standard computer. An embodiment of a user input interface 522 is illustrated in connection with an electronic gaming machine 400 of FIG. 4 as the various "buttons" 408. Other user input interface devices include a keyboard, a mouse, a microphone, a touch pad, a touch screen, voice-recognition system, etc.

The computing arrangement 500 may be connected to other computing devices or gaming machines, such as via a network. The computing arrangement 500 may be connected to a network server 528 in an intranet or local network configuration. The computer may further be part of a larger network configuration as in a global area network (GAN) such as the Internet. In such a case, the computer accesses one or more web servers 530 via the Internet 532.

Other components directed to slot machine implementations include manners of gaming participant payment, and gaming machine payout. For example, a slot machine including the computing arrangement 500 may also include a hopper controller 542 to determine the amount of payout to be provided to the participant. The hopper controller may be integrally implemented with the processor 502, or alternatively as a separate hopper controller 542. A hopper 544 may also be provided in slot machine embodiments, where the hopper serves as the mechanism holding the coins/tokens of the machine. The wager input module 546 represents any mechanism for accepting coins, tokens, coupons, bills, credit cards, smart cards, membership cards, etc. for which a participant inputs a wager amount.

Figure 6:
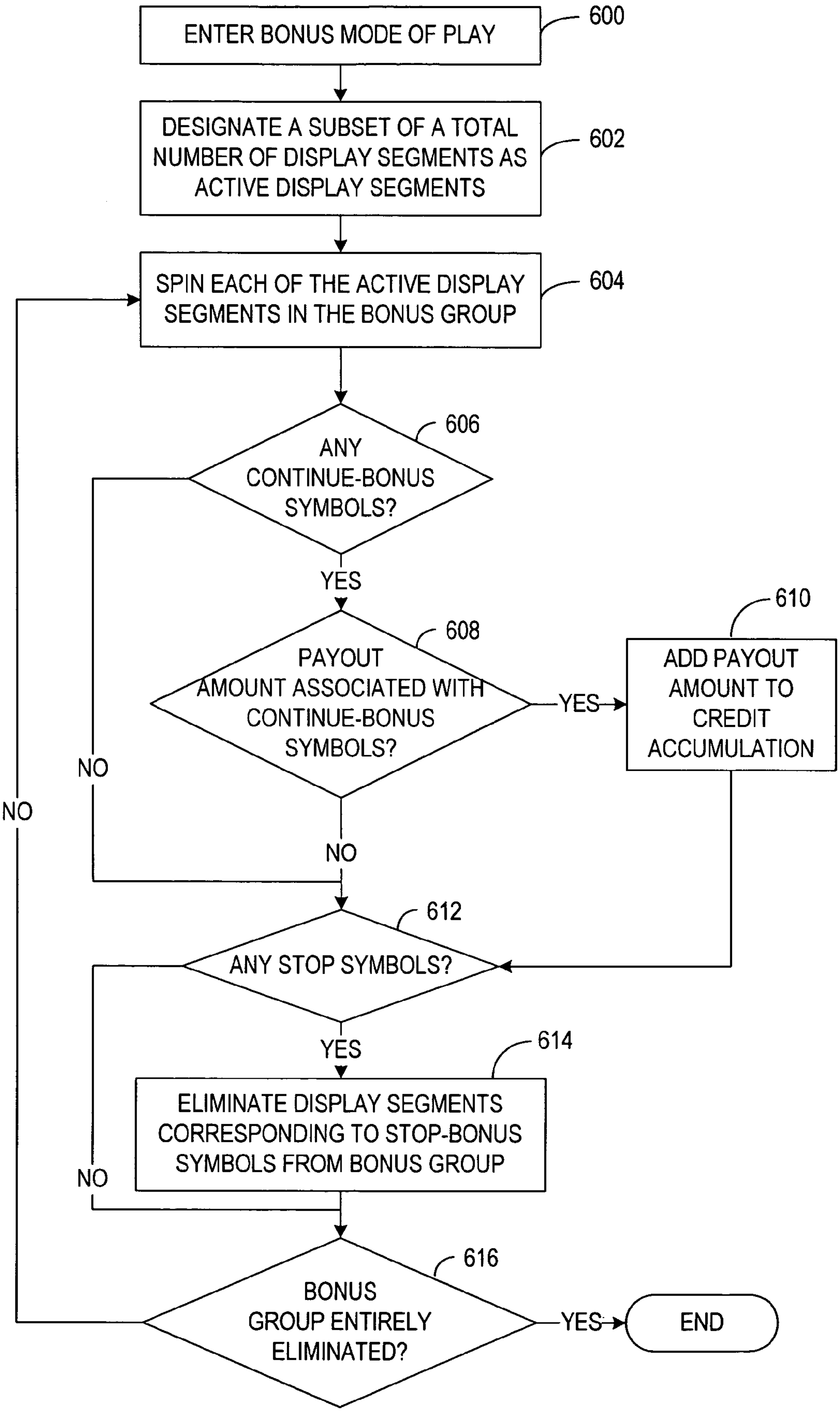
FIGS. 6 and 7 are flow diagrams illustrating representative embodiments of the elimination bonus features in accordance with the present invention.

FIG. 6 is a flow diagram illustrating one embodiment of the elimination bonus features in accordance with the present invention. In one embodiment of the invention, the display segment elimination features of the invention are implemented in connection with a bonus activity. The bonus mode of play is entered 600. A subset of all display segments on the display are designated as "active" display segments, as shown at block 602. The active display segments may be presented on any predetermined subset of the entire display segment grid. For example, the active display segments may be presented on a particular grid row, grid column, or other grid pattern. In one embodiment, the display segments that are deemed "active" are those that correspond to the symbols during the standard mode of play that gave rise to the bonus mode. For example, if three predetermined symbols occur during the standard mode of play that invoke the bonus mode, then those corresponding display segments become the active display segments during the bonus activity.

Each of the active display segments may be considered part of a "bonus group." As shown at block 604, each of the active display segments of the bonus group are subjected to an electronic "spin," similar to the manner in which reels are spun in the standard mode slot game. In one embodiment, each of the active display segments is an independent payline, such that the symbol occurring in each active display segment determines, independent of the other display segments, the result of that display segment single-symbol payline. The RNG randomly stops the spinning activity in each of the active display segments, and it is determined 606 whether any continue-bonus symbols are presented in the bonus group. If not, it is determined whether the bonus group includes any stop symbols 612. However, some or all of the continue-bonus symbols may have a payout value associated therewith, as determined at decision block 608. If so, the payout amount is added 610 to the credit accumulation, which may be added immediately, at the end of the bonus activity, or at any other predetermined time.

It is determined 612 whether any stop symbols formed part of the bonus group. If so, those display segments corresponding to stop-bonus symbols are eliminated 614 from the bonus group. If the bonus group has been entirely eliminated 616, the bonus activity ends. In other words, once each of the active display segments of the bonus activity receives a stop-bonus symbol, the bonus activity ends. If the bonus group has not been entirely eliminated as determined at decision block 616, the remaining active display segments of the bonus group (which may be a smaller bonus group due to the elimination of one or more display segments) are again spun as shown at block 604. This process of eliminating display segments associated with stop-bonus symbols, and retaining display segments associated with continue-bonus symbols, continues until all display segments have presented a stop-bonus symbol therein. At least some, and in some embodiments all, of the continue-bonus symbols are associated with a payout value which is awarded to the participant.

Figure 7:
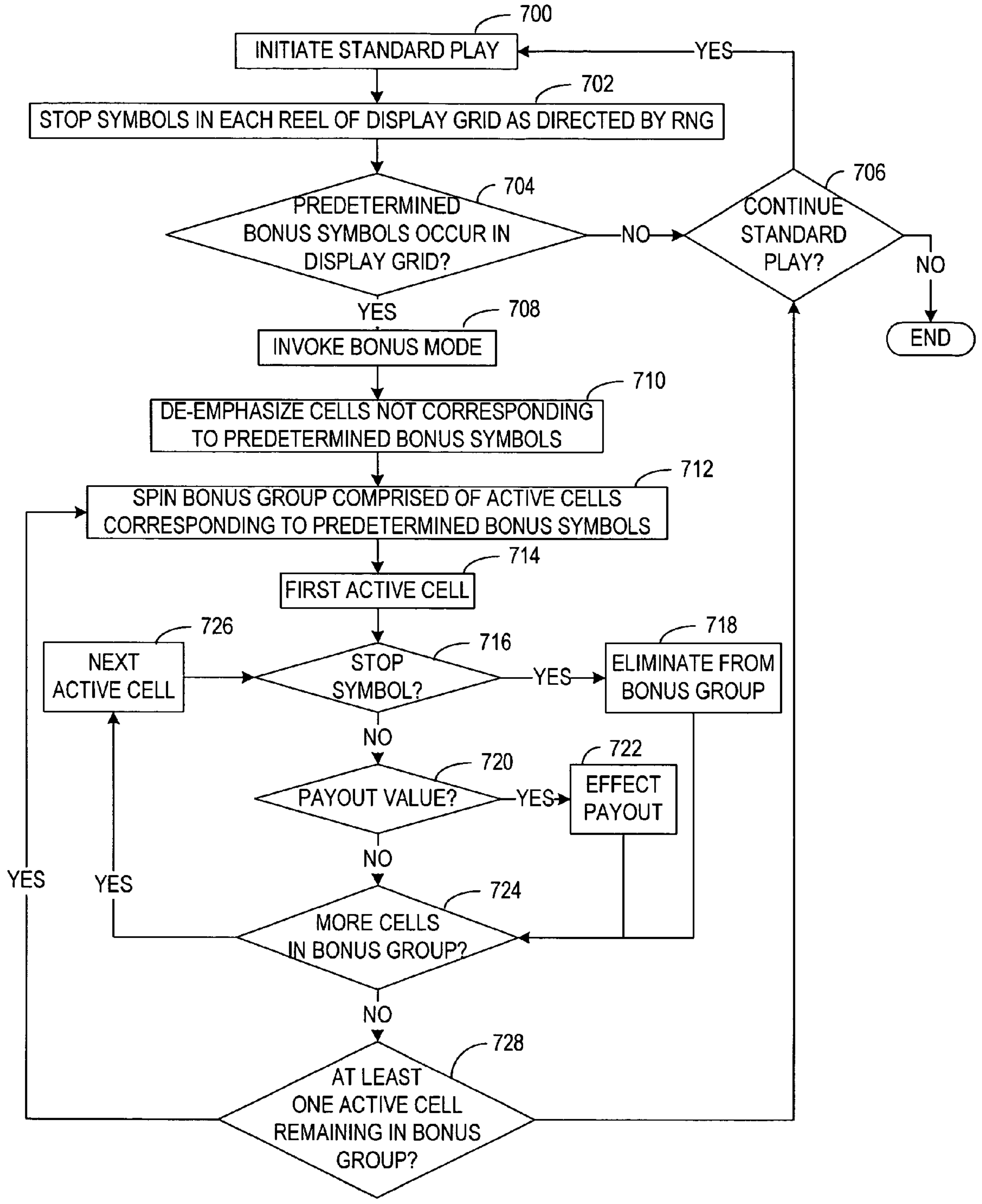

FIG. 7 is another embodiment of elimination bonus features in accordance with the present invention. In this exemplary embodiment, a standard mode of play is initiated 700. An example of participating in the standard mode is to engage in normal slot game play, where multiple reels having symbols are spun, and payouts may be effected based on the symbol combinations occurring on one or more paylines. During this standard mode of play, the symbols in each reel of the display grid are stopped in accordance with an RNG or other random generation engine, as shown at block 702. The bonus mode will be invoked if a predetermined one or more bonus symbols (or symbol arrangement) occurs in the display grid. Whether the predetermined symbols occur during standard mode play is determined at decision block 704. If the predetermined symbols giving rise to the bonus mode do not occur, the participant may decide 706 whether or not to continue standard play. If the predetermined symbols giving rise to the bonus mode are presented on the display grid, the bonus mode is invoked 708.

When the bonus mode is invoked, one embodiment of the invention includes de-emphasizing 710 those display segments or "cells" that do not correspond to the predetermined bonus symbols. For example, these cells may be "grayed out" or otherwise distinguished from those cells that do correspond to the predetermined bonus symbols. The active cells corresponding to where the predetermined bonus symbols occurred during standard play may be referred to herein as the "bonus group." The next step is to spin 712 the active cells associated with the bonus group. For example, each of the active cells will appear as if a reel is spinning at its respective location.

When this spinning action stops, a first one of the active cells is considered, as shown at block 714. If the symbol at this first cell is a stop-bonus symbol as determined at decision block 716, it will be eliminated 718 from the bonus group. If the symbol is not a stop-bonus symbol, it is a continue-bonus symbol, and it is determined 720 whether that continue-bonus symbol has an associated payout value. If so, that payout is effected 722. For example, the accumulated credit total, and/or a cell payout subtotal, may be incremented according to the payout value. It is determined 724 whether there are more active cells in the bonus group, and if so, the next active cell 726 is considered. This process continues for each of the active cells comprising the bonus group that was spun at block 712. It should be noted that the process including blocks 714, 716, 718, 720, 722, 724, and 726 are illustrated as being carried out in a sequential manner, however this is for purposes of facilitating an understanding of how each of the various active cells is analyzed for its resulting symbol. Those skilled in the art will readily recognize that these steps may be carried out serially, concurrently, or serial in part and concurrent in part.

When all of the active cells of the bonus group have been analyzed, it is determined 728 whether there is at least one active cell remaining in the bonus group. If so, this means that the bonus activity is still operative, and the "new" bonus group can then be spun 712. The "new" bonus group will include all cells that did not have stop-bonus symbols associated therewith. Therefore, the bonus group will ultimately shrink in the number of active cells, until all cells have been eliminated from the bonus group.

In accordance with another embodiment of the invention, no stop-bonus or "discontinue" symbols are implemented. Rather, the number of spins for each display segment is randomly selected, such that a stop-bonus symbol is not a symbol having a probability of being presented. Thus, in this embodiment, there is no stop-bonus symbol that has a probability of being presented to terminate the activity associated with that particular display segment.

In such an embodiment, the number of spins for each display segment (either individually or as a group or subgroup) can be determined in advance of spin initiation, or may be determined during the course of the gaming activity. For example, the number of spins may be determined during the course of the gaming activity by randomly determining after each display segment spin whether or not it will be entitled to another spin. Alternatively, the number of spins may be determined in advance. A number of different embodiments are described more fully below.

Figure 8:
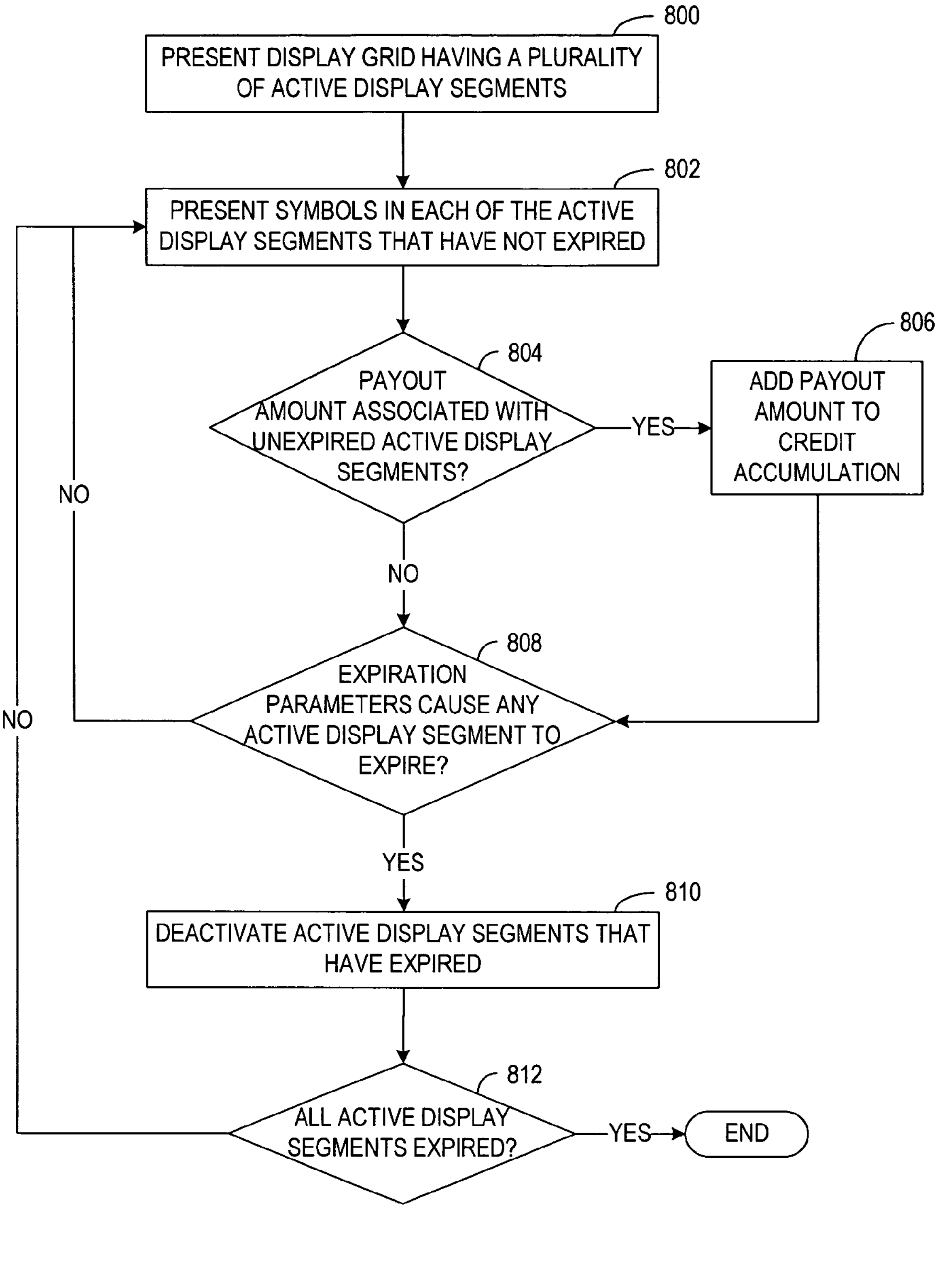
FIG. 8 illustrates an embodiment of the present invention employing display segment expiration techniques in connection with the elimination bonus features of the present invention.

The flow diagram of FIG. 8 illustrates one embodiment of the present invention employing display segment expiration techniques in connection with the elimination gaming features of the present invention. In one embodiment of the invention, the embodiment of FIG. 8 is implemented in connection with a bonus activity, although it equally applicable to a standard mode of play. A display grid having a plurality of active display segments is displayed 800. Symbols are presented 802 in each of the active display segments that have not yet "expired." Where a payout amount is associated with unexpired active display segments as determined at decision block 804, the payout is added 806 to a credit accumulation or otherwise paid out to the participant.

Whether or not a payout resulted from the unexpired active display segments, it determined 808 whether expiration parameters have caused any active display segments to "expire." In accordance with the present invention, the expiration parameters include parameters other than those that would be visually provided as part of a physical or virtual reel strip. A stop bonus (e.g., termination) or other discontinue symbol may, for example, be an actual symbol associated with the physical and/or virtual reel strip, thereby resulting in a certain probability that the stop bonus or discontinue symbol will visually present itself in a display segment. Use of the expiration parameters in accordance with the instant embodiment are parameters that will ultimately lead to an end of the bonus (or primary) gaming activity, but do so in a way where no stop bonus/discontinue symbol is presented. For example, each display segment (or group of display segments) may be associated with a randomly-generated expiration count that may or may not be divulged to the gaming participant. As a more particular example, a particular display segment may have an expiration count of four, resulting in four spins of that display segment during the gaming activity. Another example of an expiration parameter is a time duration or time lapse. For example, a display segment can be associated with a randomly-generated time duration to which that display segment will be active. Upon expiration of the time, the display segment will be deactivated from further play of that particular gaming activity, whether it be a bonus round or part of a standard/primary gaming event.

If no active display segments expired as determined at decision block 808, symbols are again presented 802 in each of the active display segments that have not expired. The expiration of any display segments will result in that particular display segment(s) being deactivated 810. For example, reaching the expiration count for a particular display segment (s) will cause that display segment(s) to be deactivated. If all active display segments have expired as determined at decision block 812, the event ends. If some active display segments have not expired, symbols are again presented 802 in each of the active display segments that have not expired. This continues until all the active display segments (or a predetermined number of remaining active display segments) have expired.

In the embodiment described in FIG. 8, no stop bonus/discontinue symbols form part of the physical or virtual reel strip, but instead expiration parameters are used to determine the end of the display segments' ability to present symbols. At least some, and in some embodiments all, of the symbols are associated with a payout value that is awarded to the participant. Otherwise, operation may be as described in connection with previous embodiments.

FIGS. 9-A and 9-B illustrate a sequence of events carried out in connection with a slot machine in accordance with one embodiment of the invention employing display segment expiration. For purposes of explanation and not of limitation, the embodiments of FIGS. 9-A and 9-B are described in terms of a bonus activity. The bonus activity according to one embodiment of the invention includes randomly or pseudo-randomly updating the active display segments 900, 902, 904 with bonus symbols that may provide the participant with credits won through the bonus activity. For example, referring to FIG. 9-A, the bonus activity includes individually presenting virtual reels in each of the display segments 900, 902, 904. In accordance with one embodiment, an RNG randomly or pseudo-randomly determines which symbols will be presented in the display segments 900, 902, 904 during the bonus activity. The degree in which the symbols are selected "randomly" may be configured as desired, such as by controlling the degree in which the symbol is randomly selected through desired statistical probability outcomes.

The bonus symbols associated with display segments 900, 902, 904 result in potential payouts to the participant. An amount value, corresponding to a number of coins or credits won, may be displayed in connection with the bonus symbols. For example, the star bonus symbol at display segment 900 indicates that one hundred credits were randomly awarded, the star bonus symbol at display segment 902 indicates that five credits were awarded, and the star bonus symbol at the display segment 904 indicates that twenty-five credits were awarded. Thus, this particular bonus round of the entire bonus activity resulted in a total of one hundred and thirty credits being awarded to the participant. The bonus symbols may be associated with positive credit/coin awards, i.e., a credit award greater than zero. Alternatively, the bonus symbols may be associated with no credits/coins (i.e., a null credit award). In another embodiment, the bonus symbols may even be associated with negative credits, such that credit accumulations are taken away from the participant.

In accordance with the display segment expiration embodiment, a particular display segment does not necessarily remain active when a bonus symbol is presented during the bonus activity. If the expiration parameters associated with a particular display segment indicate that it has expired, that display segment will be automatically deactivated and removed from further consideration of the bonus event. This is illustrated in FIG. 9-B, where the unexpired active display segments 900 and 904 re-spin, while display segment 902 has been deactivated due to its expiration. This expiration is based on randomly-selected expiration parameters, such as expiration of a predetermined expiration count or time duration. As can be seen from the sequence of events collectively shown in FIGS. 9-A and 9-B, display segment 902 has been deactivated without using a stop-bonus symbol that is part of a physical or virtual reel strip. The deactivation of display segment 902 thus had nothing to do with the star bonus symbol, or any other symbol, that may be presented in display segment 902 of FIG. 9-A. This process will continue until all (or a predetermined portion) of the display segments have been deactivated.

As described above, the expiration parameters are parameters different from those that would be visually provided as part of a physical or virtual reel strip. In one embodiment of the invention, the expiration parameters include an expiration count corresponding to a number of times in which the particular display segment(s) is allowed to spin. For example, the expiration count may be randomly selected at the time a participant enters a bonus round. In one embodiment, different expiration counts may be associated with different display segments, while in another embodiment an expiration count may be associated with a plurality, or all, of the display segments.

In a more particular example, where three display segments are active in connection with a bonus round, expiration counts may be randomly selected for each of the display segments, such as four spins for the first display segment, two spins for the second display segment, and six spins for the third display segment. These can be randomly selected via an equal selection distribution, or alternatively these selections can be weighted. For example, where selected via an equal selection distribution, the possible number of spins (e.g., one spin through fifteen spins) each have an equal likelihood of being selected. A table or other data structure of numbers between one and fifteen may be used, where selection of any of the fifteen numbers in the table/data structure has an equal likelihood of being selected as the spin number (i.e., the number of spins granted) for a particular display element. Where numbers from a table or other data structure are selected for each of the display segments, this selection may be effected with or without replacement. For example, where selection is "with replacement," the same number of spins could be associated with each of the display segments of the bonus activity. Where the selection is "without replacement," each of the display segments will have a different spin number associated with it.

In another embodiment, the table can be "weighted" such that the likelihood that a lower spin number will be selected is greater than the likelihood that a higher spin number will be selected. For example, the chances of obtaining fifteen spins for a particular display element might be ten percent, while the chances of obtaining one spin for a particular display element might be thirty percent, with the remaining spin numbers falling therebetween. Again, where numbers from a weighted table or other data structure are selected for each of the display segments, this selection may be effected with or without replacement. Further, the wager input may influence the weighting. For example, where the participant places the "maximum bet," the weighting may be changed to afford a greater weight to higher spin numbers than if the participant had not placed the maximum wager.

Different tables may be used for different display segments. For example, one display segment may have a table including five spin numbers (e.g., one through five), and another display segment may have a table including fifteen spin numbers (e.g., one through fifteen). Further, the spin number for a given display segment may or may not be revealed to the participant. For example, in one embodiment the spin number associated with one, more, or all of the display segments is not revealed to the participant, so that the participant does not know how long each display segment will remain active until a new spin begins. In another embodiment, the user may be notified visually, audibly, etc. of the number of spins that one, more, or all of the display segments will remain active. In this manner, the participant will know how many spins each display segment(s) will encounter, but the participant will generally still be unaware of what the award amounts will be for each of the display segments. In another embodiment, values other than award amounts may be associated with a bonus symbol, such as multipliers, or other known award parameters.

When the expiration count has been determined for each display segment in such a manner, the actual award amounts associated with a particular bonus symbol may also be randomly selected, such as award amount between five and one-hundred credits. Alternatively, the award amounts may be fixed for every symbol, such as ten credits.

In another embodiment, the spin number for each display segment may be randomly selected, where that spin number is then used to select that number of credit awards from a table (weighted or non-weighted). For example, if a randomly-selected spin number is six, then six award amounts in a table of award amounts will be randomly selected through either an equal distribution or a weighted distribution.

The expiration parameters may therefore be determined prior to the actual bonus round activity. For example, a spin count or time duration may be selected for a particular display segment in a manner described above, prior to any of the bonus "spins" taking place. Alternatively, the expiration parameters may be implemented as a randomly-selected expiration decision performed each time that the symbols are to be presented in each of the active display segments. For example, for a particular display segment, a first random continue/deactivate decision may be made to determine whether a further spin will be allowed for that particular display segment. If the decision is to deactivate the display segment, it will be deactivated, and other display segments may continue. If the decision is to continue, the display segment will again spin and present a symbol that may (or may not) have an award amount associated with it. At that time, another continue/deactivate decision may be made to determine whether a further spin will be allowed. These decisions are made for each upcoming spin, until the decision indicates that the display segment is to be deactivated. As an example, the decision may be weighted such that approximately 80% of the time the decision will result in the display segment remaining active for another spin, while approximately 20% of the time the decision will result in display segment deactivation. Any desired weighting may be employed.

In other embodiments, the participant is afforded an opportunity to make a selection that ultimately identifies the number of spins that a particular display segment(s) will receive. FIGS. 10-A, 10-B, and 10-C illustrate representative embodiments where the participant makes some sort of selection that identifies the number of spins that each display segment will experience. The various manners in which a participant can participate in the selection of the spin number for each display segment is virtually limitless. Therefore, the examples shown in FIGS. 10-A, 10-B, and 10-C are provided for purposes of illustration and to facilitate an understanding of this aspect of the invention. The invention is clearly not limited to these representative examples.

FIG. 10-A illustrates one manner where a gaming participant is allowed to make a selection that defines the number of spins allowed for a particular display segment. In the illustrated embodiment, a plurality of selectable items 1000, 1002, 1004, 1006, . . . 1008 are presented to the participant. These selectable items may be text, images, etc. The participant may select one of the selectable items, such as item 1004. Selection of this item reveals the number "6," which indicates that the display segments will be allowed to spin six times in connection with the bonus activity. For other display elements, the participant may then select another selectable item, such as item 1008 which reveals the number "4" to the participant, indicating that four spins will be granted to that particular display segment. Each display segment associated with the bonus activity can have a spin number selected in an analogous fashion.

FIG. 10-B illustrates a similar embodiment, but in this embodiment the spin number is not revealed to the participant. One or more items 1020 are presented to the participant. The participant selects an item, such as item 1022, which records a spin number associated with that item 1022. The participant can then select other items, such as item 1024, for other display segments. This selection process may be performed for each of the display segments that will be associated with the gaming activity (e.g., bonus round).

FIG. 10-C illustrates another embodiment for allowing participant selection of the spin numbers for display segments. In this embodiment, the participant can identify on the display grid 1030 itself which of the display segments the participant would like to select a spin number. For example, the participant can select, through an appropriate user interface, display segment 1032. At this point, a spin number may be randomly associated with display segment 1032, or alternatively a selection grid (such as those described in FIG. 10-A or 10-B) may be presented to the participant. In this manner, the participant can first identify the display segment 1032, 1034, 1036 to which a subsequent spin number selection is to be associated.

Other expiration parameters may also be used. For example, in the examples of FIGS. 10-A, 10-B, and 10-C, an expiration time duration rather than an expiration count may be selected. It should be recognized that there are many different manners in which a participant may select or guide the spin number selection process. The examples provided above are presented merely as representative examples.

In accordance with one embodiment of the invention, the display segments represent a "window" of a virtual or mechanical wheel. In other words, the display segment presents at least one of a plurality of the symbols associated with a virtual or physical reel. In accordance with another embodiment, the entire reel may be shown, but a designator highlights or otherwise identifies which of the symbols on the reel is active. In such an embodiment, at least one segment designator is used to specify which of the symbols on a particular reel is the relevant symbol for that particular spin. Thus, the segment designator(s) serves to establish the display square or other display segment for that reel or other symbol-presenting mechanism.

In accordance with one embodiment, the symbols may be presented on a face of a wheel or other rotatable shape. Such an embodiment is particularly interesting where multiple wheels are utilized. The following description describes such an embodiment and variations thereof.

Figure 11:
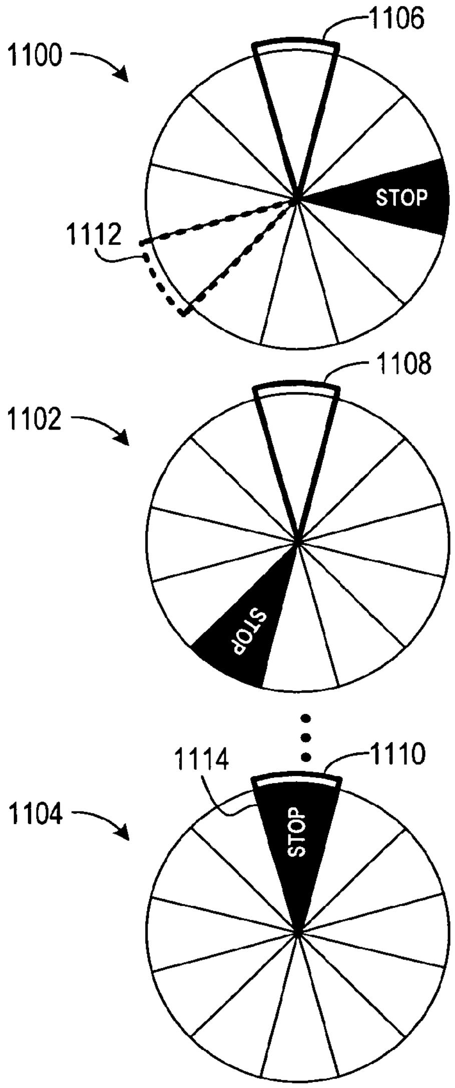
FIG. 11 is a block diagram illustrating an implementation utilizing multiple rotatable shapes to present the stop-bonus symbols and continue-bonus symbols in accordance with one embodiment of the invention.

FIG. 11 is a block diagram illustrating an implementation utilizing a plurality of rotatable shapes to present the stop-bonus symbols and continue-bonus symbols in accordance with one embodiment of the invention. In this embodiment, the rotatable shapes are depicted as an indeterminate number of circular wheels 1100, 1102, 1104, although other shapes are equally applicable. Any number of such wheels may be utilized. In one embodiment, stepper motors are used to control the rotatable shapes to allow them to be stopped with precision on the proper spot.

Figure 12:
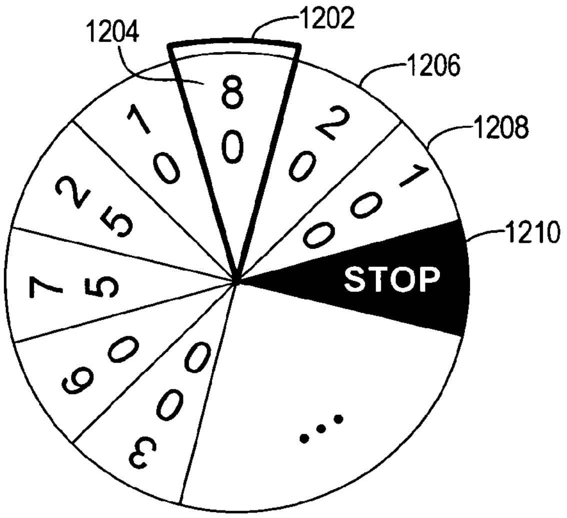
FIG. 12 illustrates one embodiment of the use of segment designators in accordance with the present invention.

Each wheel (or other rotatable shape) includes at least one segment designator 1106, 1108, 1110. As depicted by the segment designator 1112, one, some, or all of the wheels may be associated with multiple segment designators. Each segment designator delineates at least one of the symbols that is provided on its respective wheel. A more particular example illustrating the use of segment designators is shown in FIG. 12. FIG. 12 illustrates one wheel 1200 having a segment designator 1202 used to identify which of a plurality of symbols is of significance for a particular spin of the wheel 1200. More particularly, any number of "segments" may be provided on the wheel 1200, and wheel 1200 is illustrated as having an indeterminate number of such segments. Examples of the segments include segment 1204, 1206, 1208, 1210, etc. The segment designator(s) 1202 thus serve as the "display segments" as previously described. The wheel is rotated, and when it comes to a stop, one of the symbols is presented in the display segment as made possible by the segment designator 1202. In the illustrated embodiment, the segment 1204 is associated with a continue-bonus symbol that has an award value of "80" credits. This amount can be added to a credit accumulation, and the wheel is again spun since no discontinue (i.e., stop-bonus) symbol was received. If on a subsequent spin a stop-bonus symbol (e.g., STOP 210) is presented at the display segment identified by the segment designator 1202, the bonus activity for that particular wheel will be terminated for that game play. Alternatively, if on a subsequent spin another continue-bonus symbol is received, any associated value will be added to the accumulated award value. For example, if on a subsequent spin segment 1208 is provided proximate the segment designator 1202, the player would then receive another "100" credits to add to his/her payout award.

Returning to FIG. 11, each wheel operates substantially as described in connection with FIG. 12. Each wheel spins and accumulates credits, prizes, respins, or the like until a stop-bonus symbols is presented via the segment designators 1106, 1108, 1110 for the respective wheel 1100, 1102, 1104. In the illustrated embodiment of FIG. 11, wheel 1104 is shown as having been presented with a stop-bonus symbol (STOP) 1114, and therefore wheel 1104 will no longer be active (i.e., will not spin) for the remainder of the particular gaming activity. For example, if the gaming activity represents a bonus event where the bonus event ends when all wheels have obtained a stop-bonus symbol, then the wheel 1104 will not be active until the next bonus activity occurs. However, wheels 1100, 1102 do not have stop-bonus symbols associated therewith in the illustrated embodiment, and therefore wheels 1100, 1102 will again spin. If either of the wheels 1100, 1102 then receives a stop-bonus symbol, it will be inactivated for the remainder of the game play, and the other wheel will be allowed to continue with an additional spin, unless it too received a stop-bonus symbol.

It should be recognized that a single occurrence of a stop-bonus symbol does not necessarily inactivate the corresponding wheel. For example, the system may be configured to require multiple stop-bonus symbols to occur for a particular wheel before it is inactivated. The number of such stop-bonus symbols allowed before the corresponding wheel is inactivated may be established in advance, may be dependent on some condition (e.g., where three coins or maximum bet is placed, multiple stop-bonus symbols may be received before the wheel is inactivated), may be determined randomly, or the like. However, in accordance with one embodiment of the invention, each wheel 1100, 1102, 1104 is inactivated upon receipt of a single stop-bonus symbol at the respective segment designator 1106, 1108, 1110.

Figure 13:
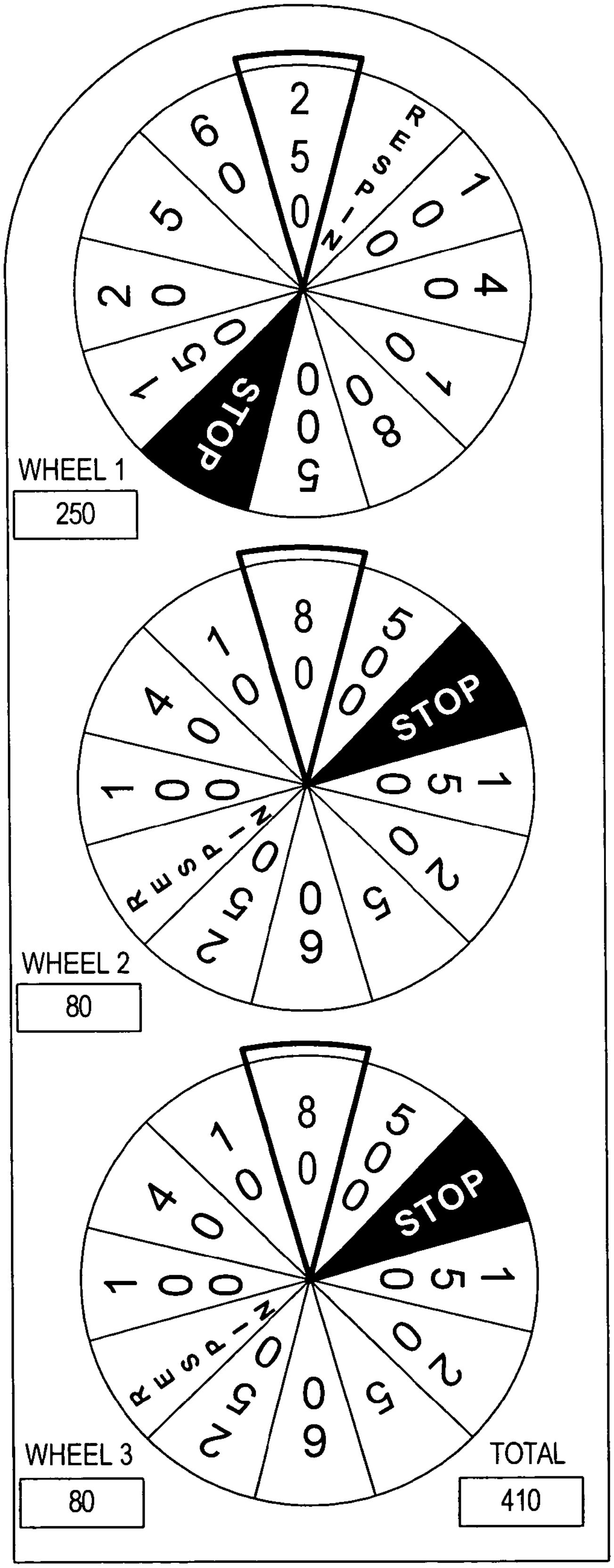
FIG. 13 illustrates a particular three-wheel embodiment in accordance with the invention.

FIG. 13 illustrates a particular three-wheel embodiment in accordance with the invention. Wheels 1300 of the illustrated embodiment each segments having indicia thereon, where the indicia includes at least some continue-bonus symbols and at least one stop-bonus symbol. The continue-bonus symbols may include numeric values to award credits or cash, or other awards such as prizes, coupons, tickets, etc. The symbol for each wheel that is identified for a particular spin is determined using the segment designators 1306, 1308, 1310.

In the illustrated embodiment, each wheel 1300, 1302, 1304 has an associated payout accumulation display 1312, 1314, 1316 where the payout accumulation for that particular wheel can be maintained. Further, a total payout accumulation display 1318 may be provided to show the sum of each of the payout accumulation displays 1312, 1314, 1316.

Figure 14:
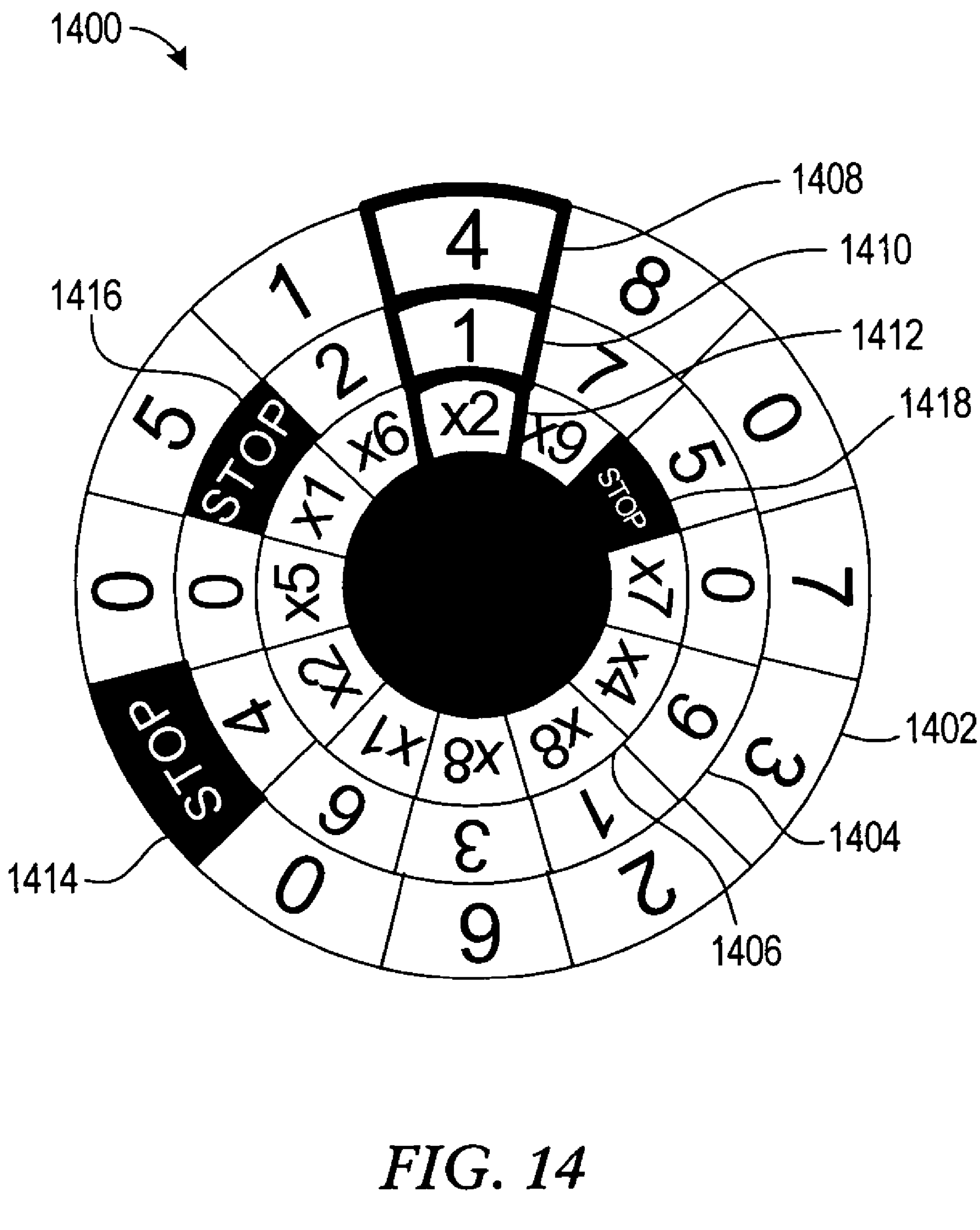
FIG. 14 illustrates a concentric wheel arrangement employing the principles of the present invention.

The wheels and display segments may be presented in different arrangements. FIG. 14 illustrates a variation of the non-concentric wheel presentations of FIG. 13 and illustrates a concentric wheel arrangement 1400. In this embodiment, three concentric wheels 1402, 1404, 1406 are provided, although a larger or smaller number of wheels may be used. For each of the wheels 1402, 1404, 1406, at least one segment designator 1408, 1410, 1412 is provided. Further, each wheel includes at least one stop-bonus symbol 1414, 1416, 1418. Each wheel 1402, 1404, 1406 is spun in the same or different directions. When the rotating wheels come to rest, the continue-bonus or stop-bonus symbol(s) presented via the segment designators 1408, 1410, 1412 determine the manner in which the gaming activity proceeds in a manner analogous to that previously described.

The segment designators may be aligned as is the case in the illustrated embodiment, or each may be placed at any location on its respective wheel. In one embodiment, the segment designators may even change location along its respective wheel, such as a lighted/electronic (and/or mechanical) segment designator that moves as its respective wheel moves. More particularly, the segment designator may move counter-clockwise as its respective wheel rotates clockwise, and both the segment designator and the wheel come to a rest to allow the segment designator on each wheel to be associated with a symbol. It should also be noted that multiple segment designators may be implemented on one or more of the wheels 1402, 1404, 1406.

It should be noted that in an embodiment such as FIG. 14 the continue-bonus symbols may take on various forms. For example, they may represent numeric payout values (e.g., "4" credits). As another example, the symbols may represent multipliers (e.g., "×2"), etc. In the illustrated embodiment, wheels 1402 and 1404 include numeric values, and wheel 1406 includes multiplier values. In one embodiment, the values on wheels 1402 and 1404 may be added, and the result multiplied by the multiplier provided on wheel 1406. In the illustrated embodiment, the result for wheel 1402 using segment designator 1408 is a value of "4"; the result for wheel 1404 using segment designator 1410 is a value of "1"; and the result for wheel 1406 using segment designator 1412 is a multiplier of "×2". In such case, the result is (4+1)×2=10 credits. Such an embodiment provides additional excitement as the payout award is at least partially dependent on multiple wheels. When a stop-bonus symbol occurs for any of the wheels, that wheel will be inactivated for the remainder of that gaming activity. For example, assume that STOP symbol 1416 is presented via segment designator 1410. In such case, the result would be 4×2=8 credits; i.e., the inactivated reel is disregarded in the calculation. As another example, assume instead that STOP symbol 1412 in the multiplier wheel 1406 is presented via segment designator 1412. In such case, the result would be 4+1=5 credits; i.e., the inactivated reel is disregarded in the calculation, and thus no multiplier will be used. Continuing with this example, if on the next spin STOP symbol 1416 is presented via segment designator 1410, the result will be simply "4" credits since no other wheels are still activated to add/multiply with. Such a concept may be used for any similar mathematical functions (e.g., different variations of subtraction, addition, multiplication, division, etc.). For example, the wheel 1406 could include different mathematical functions for different segments, such as ×5, /2, −3, etc.

Figure 15:
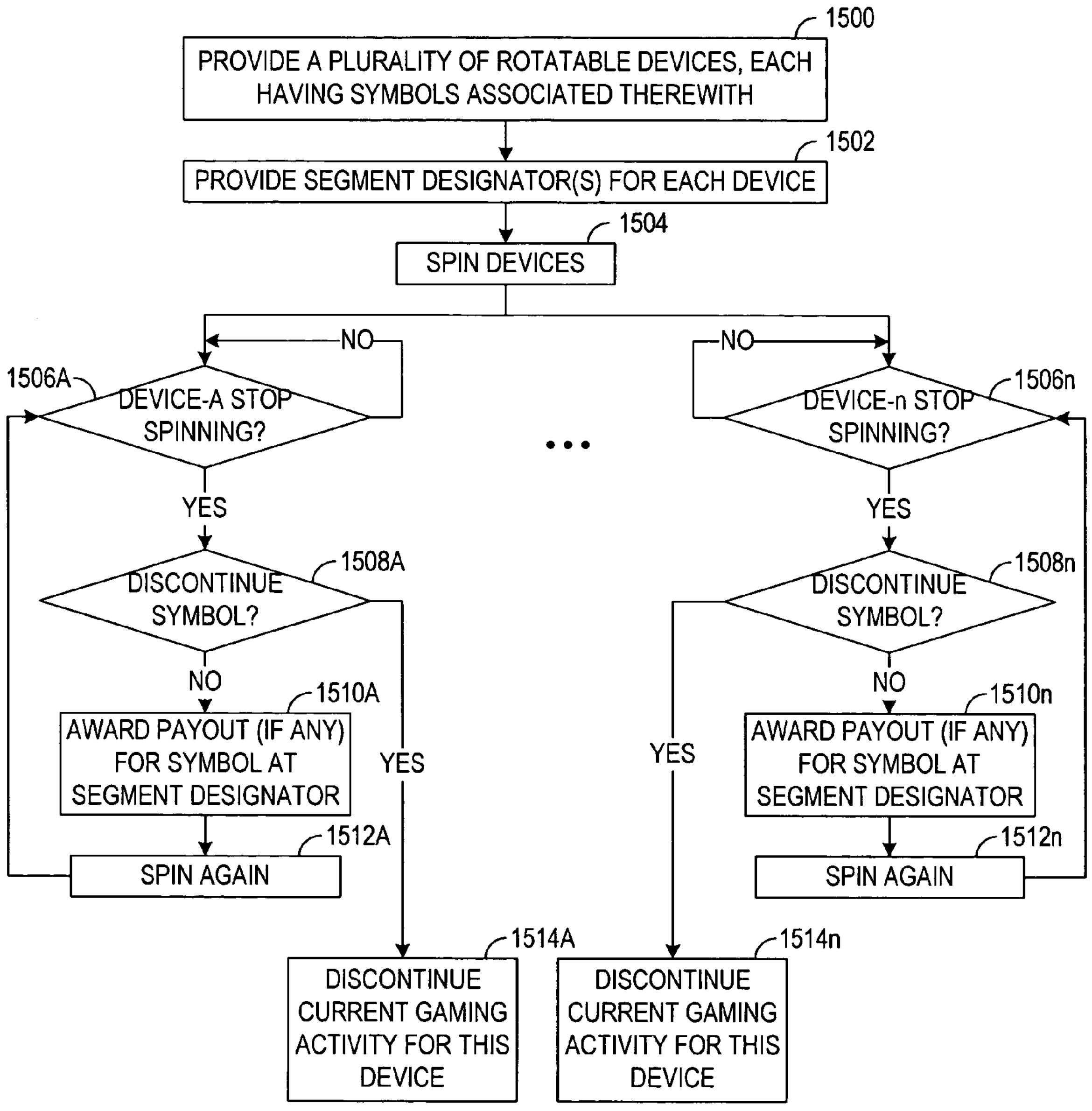
FIGS. 15 and 16 are flow diagrams illustrating embodiments of manners for providing a gaming activity in accordance with the invention.

FIG. 15 is a flow diagram illustrating one embodiment of a manner for providing a gaming activity in accordance with the invention. A plurality of rotatable devices are provided 1500, where each of the devices has symbols associated therewith. For example, multiple wheels may be provided with symbols on each of the wheels' faces. The rotatable devices may be provided as physical or electronic wheels, and/or physical or electronic reels. A segment designator(s) is provided 1502 for each device, and the rotatable devices are spun 1504. For each of the devices, it may be spun until receiving a discontinue symbol. This is illustrated in FIG. 15, where each of the rotatable devices will stop spinning, and it is determined whether a discontinue symbol is associated therewith. For example, for a first device, device-A, it is determined 1506A whether the spinning has stopped. When it has, it is determined 1508A whether a discontinue symbol is presented at its segment designator(s). If so, the current gaming activity for that particular device is discontinued 1514A. Otherwise, an award payout may be provided, depending on the particular symbol(s) that were presented via the segment designator for that device. Since no discontinue symbol was received, that device may be spun again as illustrated at block 1512A, and the process is repeated. This occurs for each of the rotatable devices associated with the system. For example, FIG. 15 illustrates a similar process for all devices through an indeterminate number of devices represented by device-n. A similar process occurs, as shown by blocks 1506*n*, 1508*n*, 1510*n*, 1512*n*, and 1514*n*.

Figure 16:
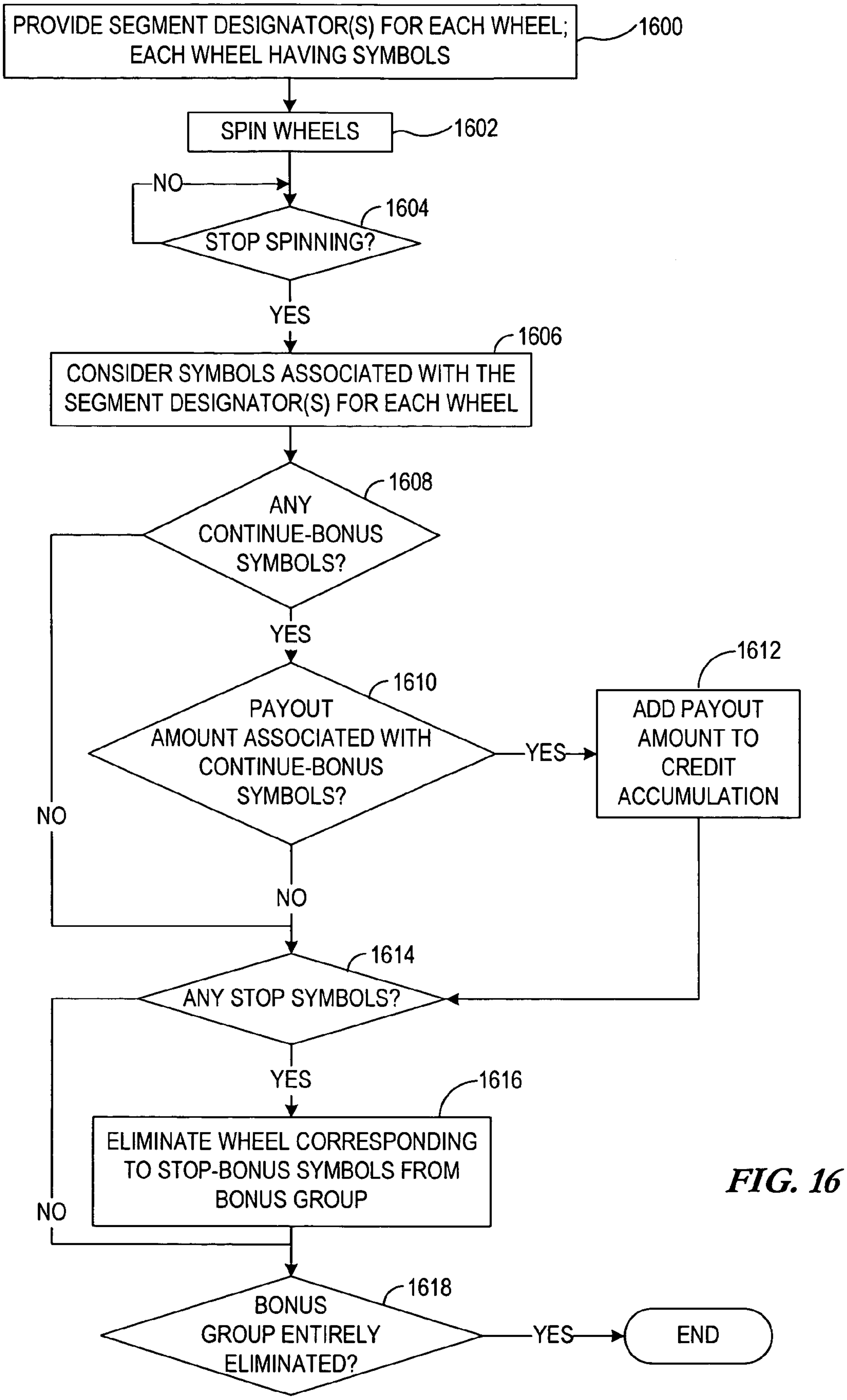

FIG. 16 is a flow diagram illustrating another embodiment of a method for providing a gaming activity in accordance with the invention. At least one segment designator is provided 1600 for each wheel (or other shape), and each wheel includes a plurality of symbols. The wheels are spun 1602, and when they stop spinning 1604, those symbols associated with the segment designators for each wheel are considered 1606. If any continue-bonus symbols are presented at the various segment designators as determined at decision block 1608, it is then determined 1610 if any payout amount is associated with the continue-bonus symbols, and if so the payout amount is added 1612 to a credit accumulation. For any segment designators presenting stop symbols as determined at decision block 1614, the wheel(s) having a stop-bonus symbol presented in its respective segment designator is eliminated 1616 from the bonus group and no longer considered for the particular gaming activity. When the bonus group has been entirely eliminated (e.g., no more wheels are active) as determined at decision block 1618, the particular gaming activity ends (e.g., the bonus activity ends).

Figure 17:
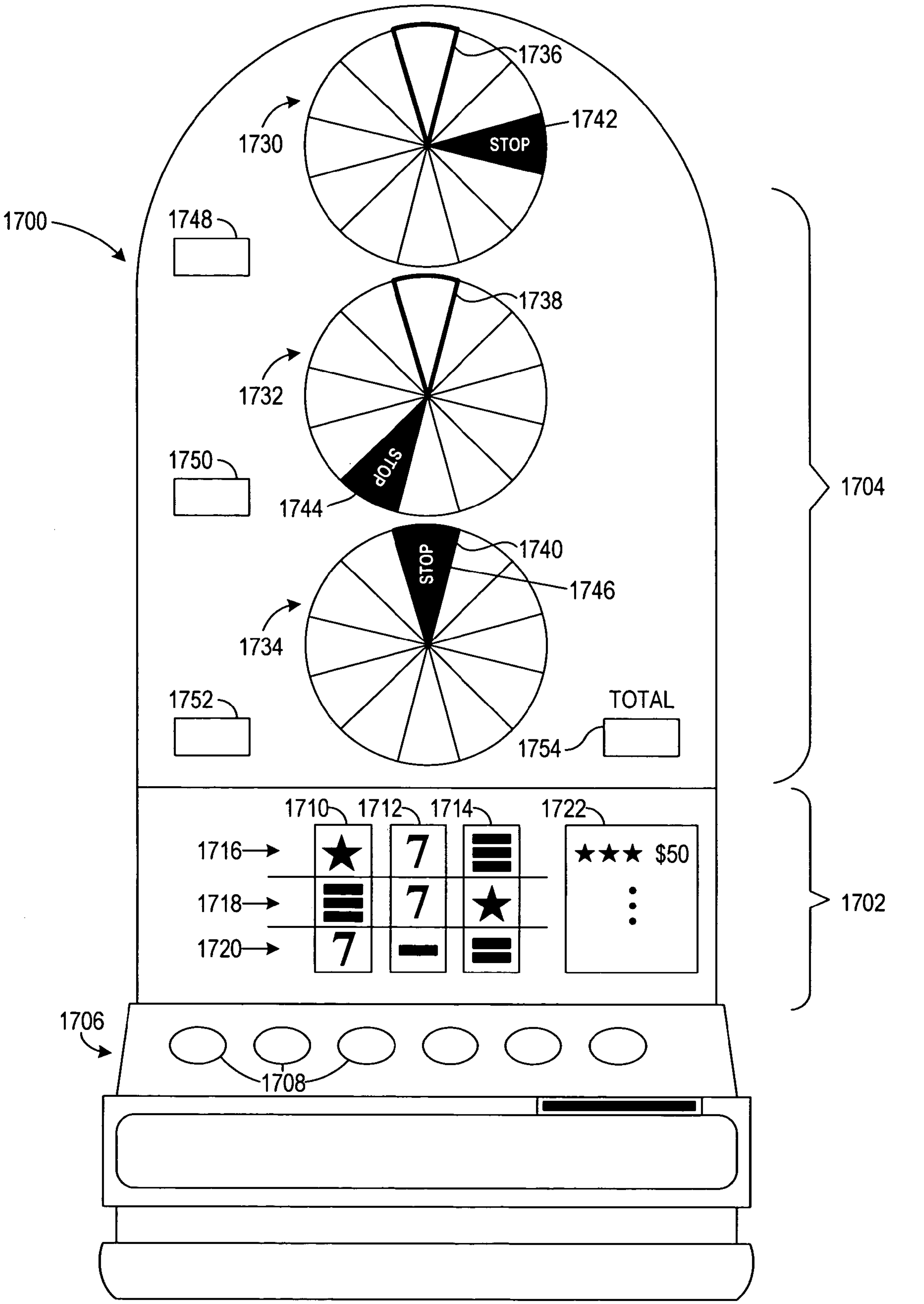
FIG. 17 is an embodiment of a casino-style gaming device in which the principles of the present invention may be applied as a bonus activity.

FIG. 17 is an embodiment of a casino-style gaming device in which the principles of the present invention may be applied as a bonus activity. Many traditional casino table games may be provided in a "video game" available via a casino-style gaming device shown in FIG. 17. For purposes of explanation, the description of the gaming device is FIG. 17 is provided in terms of a slot machine 1700. However, the present invention is analogously applicable to other casino-style games (video poker, video bingo, etc.) having the ability to include at least one bonus activity. The present invention is also applicable as a bonus event for table games such as poker or other gaming activities.

The slot machine 1700 is a structure including at least a primary gaming activity presentation 1702 and a bonus activity presentation 1704. The slot machine 1700 includes a housing for embodiments having a self-supported, independent structure. A user interface 1706 is provided to allow the user to control and engage in play of the slot machine 1700. The particular user interface mechanisms associated with user interface 1706 is dependent on the type of gaming machine. For example, the user interface 1706 may include one or more buttons, switches, joysticks, levers, pull-down handles, trackballs, voice-activated input, or any other user input system or mechanism that allows the user to play the particular gaming activity. The user input 1706 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 1706 that the user can initiate the standard mode of play, and in some embodiments may optionally control certain aspects of the bonus mode of play. In the case of a slot machine, the user input may include a plurality of buttons, e.g., button 1708, which allow the user to enter a number of credits to play, identify the number of paylines in which to participate, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, pulling a handle/lever, or other known user entry methodology. The particular user interface mechanism employed is not relevant to the present invention.

The primary gaming activity presentation 1702 may be provided via a video display device or via mechanical reels or devices. In the case of a video display device, the display device may take on a variety of forms depending on what type of presentation is to be provided. For example, a standard slot gaming activity includes multiple reels 1710, 1712, 1714, and in the illustrated embodiment three paylines 1716, 1718, 1720 are provided. Any number of paylines and/or reels may be provided where the primary gaming activity is a slot game.

Also associated with the gaming device 1700 may be a pay table 1722, where information associated with the potential winning symbol combinations of the standard slot game activity may be presented. This area may also provide an indication of the requisite symbols, symbol combinations, symbol locations, etc. that are required to invoke the bonus mode in accordance with the invention. This information may be part of a display screen, or alternatively may be separate from the display screen and provided directly on a portion of the structure itself. For example, a backlit colored panel may be used as the winning guide area.

When the player achieves the requisite bonus qualifying criteria via the primary gaming activity, the player will be allowed to participate in the bonus activity in accordance with the present invention. The bonus activity illustrated in FIG. 17 is a multi-wheel device as previously described, having three wheels 1730, 1732, 1734 in the illustrated embodiment. Each of the wheels 1730, 1732, 1734 includes a respective segment designator 1736, 1738, 1740, and at least one discontinue symbol 1742, 1744, 1746. A wheel payout indicator 1748, 1750, 1752 may be provided for each wheel 1730, 1732, 1734 to indicate the payout accumulation for its respective one of the wheels 1730, 1732, 1734. A total payout indicator 1754 may also be provided to indicate the total accumulated payout award from all of the wheels 1730, 1732, 1734. The gaming activity is performed in a manner as previously described.

Figure 18:
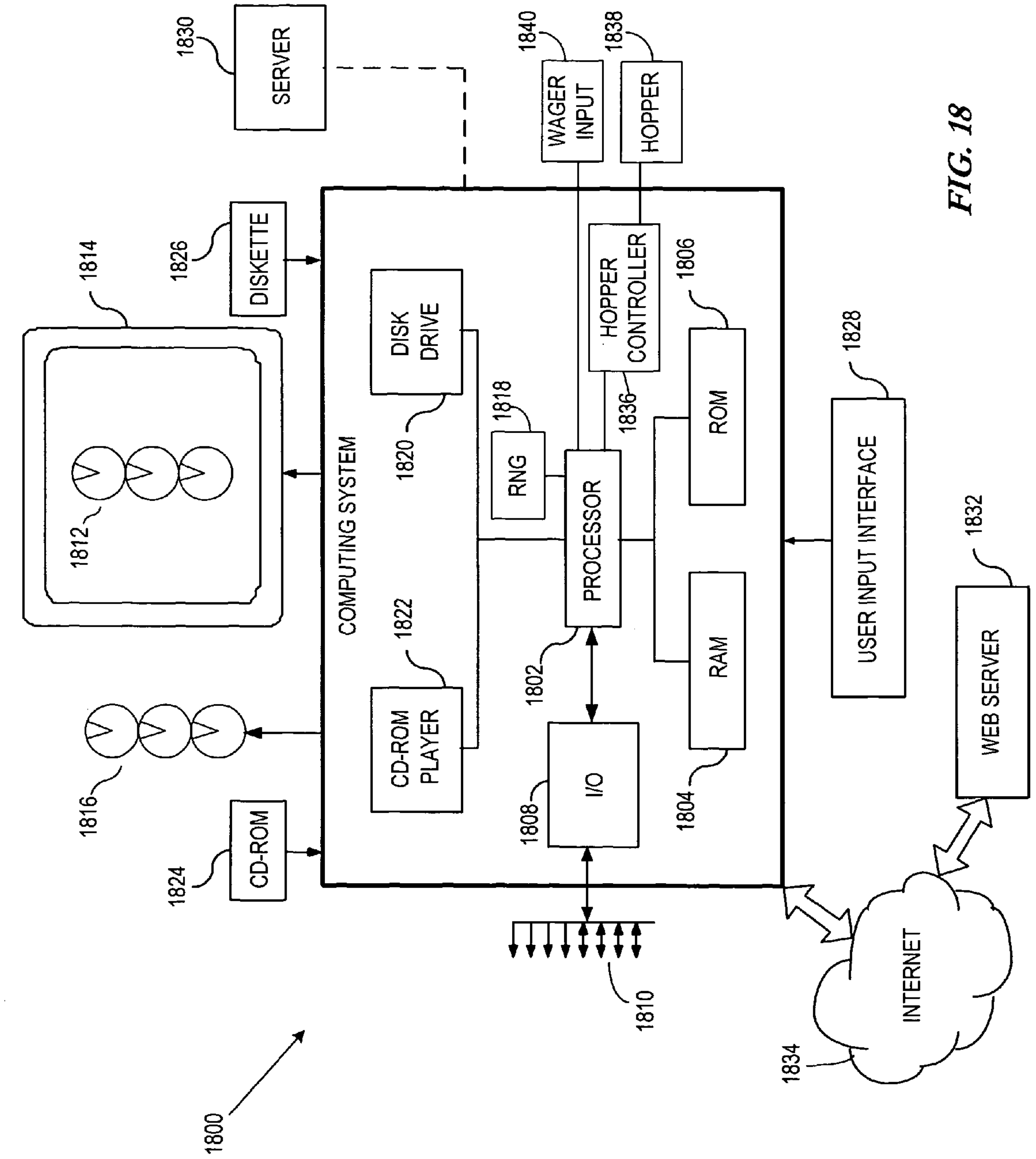
FIG. 18 illustrates a representative computing system capable of carrying out operations in accordance with the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 18.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1800 of FIG. 18 is an example computing structure that can be used in connection with the primary gaming activity and/or bonus gaming activity for such electronic gaming machines.

The example computing arrangement 1800 suitable for performing the primary and/or bonus activity in accordance with the present invention includes a central processor (CPU) 1802 coupled to random access memory (RAM) 1804 and some variation of read-only memory (ROM) 1806. The ROM 1806 may also be other types of storage media to store programs, such as programmable ROM (PROM), erasable PROM (EPROM), etc. The processor 1802 may communicate with other internal and external components through input/output (I/O) circuitry 1808 and bussing 1810, to provide control signals, communication signals, and the like.

Control of the gaming activity 1812 on a display 1814, and/or control of mechanical wheels/shapes 1816 in accordance with the invention are provided in part by a random number generator (RNG), and may be implemented using hardware, software operable in connection with the processor 1802, or some combination of hardware and software. In accordance with generally known technology in the field of slot machines, the processor 1802 associated with the slot machine, under appropriate program instruction, can simulate the rotation of the plurality of wheels. The present invention is operable using any known RNG, and may be integrally programmed as part of the processor 1802 operation, or alternatively may be a separate RNG controller 1818. RNGs are well known in the art, and any type of RNG may be implemented for the standard mode of play and/or the bonus mode of play in accordance with the invention. Further, all or part of the processing and/or RNG function may be provided locally or all or part may be provided remotely, such as having the random value/event downloaded from a networked system in a central determination configuration.

The computing arrangement 1800 may also include one or more data storage devices, including hard and floppy disk drives 1820, CD-ROM drives 1822, and other hardware capable of reading and/or storing information such as DVD, etc. In one embodiment, software for carrying out the standard and/or bonus gaming operations in accordance with the present invention may be stored and distributed on a CD-ROM 1824, diskette 1826 or other form of media capable of portably storing information. These storage media may be inserted into, and read by, devices such as the CD-ROM drive 1822, the disk drive 1820, etc. The software may also be transmitted to the computing arrangement 1800 via data signals, such as being downloaded electronically via a network, such as the Internet. Further, as previously described, the software for carrying out the functions associated with the present invention may alternatively be stored in internal memory/storage of the computing device 1800, such as in the ROM 1806. The computing arrangement 1800 may be coupled to a display 1814, which represents a display on which the gaming activities in accordance with the invention may be presented. The display 814 may represent the "presentation" of the video information in accordance with the invention, and may be any type of known display or presentation screen, such as LCD displays, plasma display, cathode ray tubes (CRT), etc. Where the computing device 1800 represents a stand-alone or networked computer, the display 1820 may represent a standard computer terminal or display capable of displaying multiple windows, frames, etc. A user input interface 1828 such as a mouse or keyboard may be provided where the computing device 1800 is associated with a standard computer. User input interface devices may include buttons, joysticks, keyboard, mouse, microphone, touch pad, touch screen, voice-recognition system, etc.

The computing arrangement 1800 may be connected to other computing devices or gaming machines, such as via a network. The computing arrangement 1800 may be connected to a network server 1830 in an intranet or local network configuration. The computer may further be part of a larger network configuration as in a global area network (GAN) such as the Internet. In such a case, the computer accesses one or more web servers 1832 via the Internet 1834.

Other components directed to slot machine implementations include manners of gaming participant payment, and gaming machine payout. For example, a slot machine including the computing arrangement 1800 may also include a hopper controller 1836 to determine the amount of payout to be provided to the participant. The hopper controller may be integrally implemented with the processor 1802, or alternatively as a separate hopper controller 1836. A hopper 1838 may also be provided in slot machine embodiments, where the hopper serves as the mechanism holding the coins/tokens of the machine. The wager input module 1840 represents any mechanism for accepting coins, tokens, coupons, tickets (e.g., ticket-in-ticket-out; TITO), bills, credit cards, smart cards, membership cards, electronic funds transfers and the like for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture," "computer program product," and/or computer-readable medium as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

Many modifications and variations are possible in light of the above teaching. For example, the present invention is not limited to what is traditionally known as "slot machines." The present invention is applicable to any gaming device or table game to incorporate bonus rounds in connection with a gaming system. Also, while the illustrated embodiments have been described in large part in connection with a "slot machine," other gaming systems and concepts are also within the scope of the invention, such as video poker games, card games, and other casino events.

Further, it should be recognized that the manner of providing a repeated elimination of display segments as described herein may be applied during a standard mode of play as well as in a bonus mode of play. For example, the standard mode of play may be configured to allow the participant to continually engage in such a repeated elimination game without entering a bonus mode. In such a case, it may be desirable to provide a higher percentage of "continue" symbols that are associated with no credit award, or lesser credit awards to arrive at the targeted payout percentage of the slot game. Where the present invention is utilized as a standard play game, the user would first initiate the standard play (e.g., by pulling a lever, pushing a "play," "spin," "bet maximum credits," or other analogous play initiation button). In one such embodiment, all of the wheels and corresponding display segments, or a predetermined or random subset of the display segments, are activated. The wheels are spun and stopped to randomly provide symbols in each of the activated display segments/segment designators. Continue symbols would keep the associated display segments active for a subsequent spin, while stop or "discontinue" symbols would be eliminated from further spins for the remainder of that particular play event. Either or both of the continue symbols may be associated with credit awards, or may be associated with no credit award. In any case, the continue symbols allow the associated display segment to remain active, while discontinue symbols prohibit the associated display segment from further activity during that play event. The activated display segments identified by the segment designators repeatedly reduce in number as discontinue symbols appear, until each of the wheels has been associated with a discontinue symbol, thereby ending that particular play event. The standard play would then continue by initiating a new play event. Further, bonus rounds may still be associated with this standard play activity, and in one embodiment, the principles of the present invention may also be applied to that bonus event, such as by providing statistically higher credit awards to the continue (and optionally discontinue) symbols during the bonus event.

As can be seen from the foregoing description, the exemplary embodiments of the invention described herein have been presented for the purposes of illustration and description, and many modifications and variations are possible in light of the above teaching. The description of these exemplary embodiments is not intended to be exhaustive or to limit the invention to the precise form disclosed. It is thus not intended that the scope of the invention be limited with this detailed description, but rather by the claims appended hereto.

What is claimed is:

1. A method of operating a gaming system including a plurality of instructions, the method comprising:

(a) causing at least one processor to execute the plurality of instructions to enable a player to place a wager on a play of a game;

(b) causing at least one display device to display, in association with the play of the game, a plurality of different wheels, each of the wheels having a plurality of symbols including a discontinue symbol;

(c) causing the at least one processor to execute the plurality of instructions to determine an active group of the wheels, the active group including a plurality of the wheels;

(d) causing the at least one processor to execute the plurality of instructions to spin all of the wheels of the active group;

(e) causing the at least one processor to execute the plurality of instructions to stop all of the wheels of the active group, wherein all of the wheels of the active group are stopped prior to any subsequent spinning of any of the wheels of the active group;

(f) after all of the wheels of the active group have spun and stopped:

(i) causing the at least one display device to indicate at least one of the symbols on each of the stopped wheels of the active group;

(ii) causing the at least one processor to execute the plurality of instructions to determine whether to provide an award to the player, wherein the determination is based on each of the symbols indicated on each of the stopped wheels of the active group;

(iii) if the determination is to provide the award to the player, causing the determined award to be provided to the player; and (iv) after determining whether to provide the award to the player:

(A) in response to none of the discontinue symbols being indicated on any one of the stopped wheels of the active group, causing the at least one processor to execute the plurality of instructions to repeat (d) to (f) for all of the wheels of the active group, (B) in response to one of the discontinue symbols being indicated on at least one, but less than all, of the stopped wheels of the active group:

(1) causing the at least one processor to execute the plurality of instructions to deactivate each wheel which is associated with the indicated discontinue symbol from the active group, and (2) causing the at least one processor to execute the plurality of instructions to repeat (d) to (f) for each wheel which is not deactivated from the active group, and (C) in response to one of the discontinue symbols being indicated on all of the stopped wheels of the active group, causing the at least one processor to execute the plurality of instructions to deactivate all of the wheels of the active group.

2. The method of claim 1, which includes causing the at least one display device to display at least one indicator in association with each wheel, the at least one indicator being configured to indicate at least one symbol on the associated wheel.

3. The method of claim 1, which includes causing the at least one display device to display a different set of symbols on each of the wheels, wherein each set of symbols includes the at least one discontinue symbol and a plurality of award symbols.

4. The method of claim 1, which includes causing the at least one display device to display the active group of wheels for the play of the game, wherein the game includes a primary game.

5. The method of claim 1, which includes causing the at least one display device to display the active group of wheels for the play of the game after a triggering event occurs in association with the game.

6. The method of claim 5, which includes causing the at least one processor to execute the plurality of instructions to determine whether the triggering event occurs in association with the game, and if the triggering event occurs, enabling participation in a play of a bonus game including the active group of wheels.

7. The method of claim 1, wherein for each of the wheels, the plurality of symbols includes at least one continue symbol, and wherein if the at least one continue symbol is indicated on any one of the wheels of the active group, the wheel remains activated in the active group.

8. The method of claim 7, which includes associating a credit award with one or more of the continue symbols.

9. The method of claim 8, which includes associating a positive credit award having an additive effect on an accumulated credit total with one or more of the continue symbols.

10. The method of claim 8, which includes associating a null credit award having no positive or negative effect on an accumulated credit total with one or more of the continue symbols.

11. The method of claim 8, which includes associating a negative credit award having a subtractive effect on an accumulated credit total with one or more of the continue symbols.

12. The method of claim 1, which includes associating a credit award with one or more of the discontinue symbols.

13. The method of claim 12, which includes associating a positive credit award having an additive effect on an accumulated credit total with one or more of the discontinue symbols.

14. The method of claim 12, which includes associating a null credit award having no positive or negative effect on an accumulated credit total with one or more of the discontinue symbols.

15. The method of claim 12, which includes associating a negative credit award having a subtractive effect on an accumulated credit total with one or more of the discontinue symbols.

16. The method of claim 1, which includes causing the at least one display device to display any one of the deactivated wheels differently than any of the wheels in the active group for a remainder of the play of the game.

17. The method of claim 1, which includes, for each wheel in the active group, causing the at least one display device to display said wheel until said wheel is deactivated.

18. The method of claim 1, which includes causing the at least one display device to display a user interface to allow a player to initiate the repeating of (d) to (f).

19. The method of claim 1, which includes causing the at least one display device to display the plurality of the wheels such that each of the wheels is associated with a plurality of display segments and each of the display segments is associated with at least one of the symbols indicated on each of the stopped wheels.

20. The method of claim 1, which includes causing the at least one display device to display the wheels of the active group concentrically and associating at least one indicator with each wheel of the active group, each indicator being configured to indicate at least one of the symbols on the associated wheel.

21. The method of claim 1, which includes causing the at least one display device to display all of the wheels of the active group concentrically.

22. The method of claim 21, which includes, causing the at least one processor to execute the plurality of instructions, for each one of the deactivated wheels, to cause said deactivated wheel to not spin for a remainder of the play of the game.

23. The method of claim 1, which includes causing the at least one processor to execute the plurality of instructions to determine the award to be provided to the player based on each of the symbols indicated on a plurality of the wheels of the active group, and cause the determined award to be provided the player.

24. The method of claim 23, which includes associating an award value with each one of the symbols indicated on the plurality of the wheels of the active group, summing the award values associated with any of the symbols indicated on the plurality of the wheels of the active group to determine the award to be provided to the player, and causing the determined award to be provided to the player.

25. The method of claim 1, which includes causing the at least one processor to execute the plurality of instructions, for each wheel in the active group, to deactivate said wheel if said wheel indicates a designated number of the discontinue symbols.

26. The method of claim 1, which includes at least one of: (i) simultaneously spinning all of the wheels of the active group, and (ii) simultaneously stopping all of the wheels of the active group.

27. A method of operating a gaming system including a plurality of instructions, the method comprising:

(a) causing at least one processor to execute the plurality of instructions to enable a player to place a wager on a play of a game;

(b) causing at least one display device to display, in association with the play of the game, a plurality of different rotatable shapes, wherein each of the rotatable shapes includes a plurality of symbols;

(c) causing the at least one processor to execute the plurality of instructions to simultaneously activate each one of the plurality of rotatable shapes;

(d) causing the at least one processor to execute the plurality of instructions to spin all of the active rotatable shapes;

(e) causing the at least one processor to execute the plurality of instructions to stop all of the active rotatable shapes, wherein all of the active rotatable shapes are stopped prior to any subsequent spinning of any of the active rotatable shapes;

(f) after all of the active rotatable shapes have spun and stopped:

(i) causing the at least one display device to indicate at least one of the symbols on each of the active rotatable shapes which has stopped;

(ii) causing the at least one processor to execute the plurality of instructions to determine whether to provide an award to the player, wherein the determination is based on each of the symbols indicated on each of the active rotatable shapes which has stopped;

(iii) if the determination is to provide the award to the player, causing the determined award to be provided to the player; and (iii) after determining whether to provide the award to the player, causing the at least one processor to execute the plurality of instructions to determine whether to deactivate subsequent spinning of at least one of the active rotatable shapes based on at least one of the indicated symbols, wherein:

(A) in response to the determination being that none of the discontinue symbols are indicated on any one of the active rotatable shapes which has stopped, causing the at least one processor to execute the plurality of instructions to repeat (d) to (f) for all of the active rotatable shapes, (B) in response to the determination being that one of the discontinue symbols is indicated on at least one, but less than all, of the active rotatable shapes which have stopped:

(1) causing the at least one processor to execute the plurality of instructions to deactivate each of said rotatable shapes associated with the indicated discontinue symbol from further spinning for a remainder of the play of the game, and (2) causing the at least one processor to execute the plurality of instructions to repeat (d) to (f) for each of said rotatable shapes which is not deactivated, and (C) in response to the determination being that one of the discontinue symbols is indicated on all of the active rotatable shapes which have stopped, causing the at least one processor to execute the plurality of instructions to deactivate all of the rotatable shapes.

28. The method of claim 27, which includes causing the at least one processor to execute the plurality of instructions to randomly determine whether to deactivate subsequent spinning of at least one of the active rotatable shapes when the active rotatable shapes stop spinning.

29. The method of claim 27, which includes causing the at least one display device to display at least one indicator associated with each one of the active rotatable shapes, each one of the indicators being configured to indicate one of the symbols on one of the active rotatable shapes when the active rotatable shapes stop spinning.

30. The method of claim 27, which includes causing the at least one display device to display the rotatable shapes concentrically.

31. The method of claim 27, which includes at least one of: (i) simultaneously spinning all of the active wheels, and (ii) simultaneously stopping all of the active wheels.

32. A gaming system comprising:

at least one display device;

at least one user input device;

at least one processor; and at least one memory device which stores a plurality of instructions which when executed by the at least one processor cause the at least one processor to operate with the at least one display device and the at least one input device to:

(a) enable a player to place a wager on a play of a game;

(b) display, in association with the play of the game, a plurality of different wheels, each of the wheels having a plurality of symbols including a discontinue symbol, (c) determine an active group of the wheels, the active group including a plurality of the wheels, (d) spin all of the wheels of the active group, (e) stop all of the wheels of the active group, wherein all of the wheels of the active group are stopped prior to any subsequent spinning of any of the wheels of the active group, (f) after all of the wheels of the active group have spun and stopped:

(i) indicate at least one of the symbols on each of the stopped wheels of the active group, (ii) determine whether to provide an award to the player, wherein the determination is based on each of the symbols indicated on each of the stopped wheels of the active group, (iii) if the determination is to provide the award to the player, cause the determined award to be provided to the player, and (iv) after determining whether to provide the award to the player:

(A) in response to none of the discontinue symbols being indicated on any one of the stopped wheels of the active group, repeat (d) to (f) for all of the wheels of the active group, (B) in response to one of the discontinue symbols being indicated on at least one, but less than all, of the stopped wheels of the active group:

(1) deactivate said wheel associated with the indicated discontinue symbol from the active group, and (2) repeat (d) to (f) for each wheel which is not deactivated from the active group, and (C) in response to one of the discontinue symbols being indicated on all of the stopped wheels of the active group, deactivate all of the wheels of the active group.

33. The gaming system of claim 32, wherein a plurality of the symbols are associated with an award value, and which includes at least one instruction stored in the at least one memory device which when executed by the at least one processor causes the at least one processor to operate with the at least one display device and the at least one input device to determine the award to be provided to the player based on the award values of each of the symbols indicated on each of the stopped wheels of the active group.

34. The gaming system of claim 32, wherein the game includes a primary game.

35. The gaming system of claim 32, which includes a bonus game initiated in response to an occurrence of a triggering event in association with the game, wherein the plurality of different wheels are displayed in the bonus game after the occurrence of the triggering event.

36. The gaming system of claim 35, wherein the game includes a primary game selected from at least one of: a slot game, a poker game, a bingo game, and a keno game.

37. The gaming system of claim 32, which includes at least one instruction stored in the at least one memory device which when executed by the at least one processor causes the at least one processor to operate with the at least one display device and the at least one input device to, for each of the wheels deactivated from the active group, cause said wheel to not spin for a remainder of the play of the game.

38. The gaming system of claim 32, wherein the plurality of instructions, which when executed by the at least one processor, cause the at least one processor to cause at least one of: (i) all of the wheels of the active group to spin simultaneously, and (ii) all of the wheels of the active group to stop simultaneously.

39. A gaming system comprising:

at least one display device;

at least one user input device;

at least one processor; and at least one memory device which stores:

(a) data representing:

(i) a game, (ii) a plurality of different wheels, (iii) a plurality of different wheel symbols including:

(x) a plurality of discontinue symbols displayable on the wheels, and (y) a plurality of award symbols displayable on the wheels, (iv) a plurality of different indicators associated with the wheels to indicate at least one symbol on each of the wheels, (b) a plurality of instructions, which when executed by the at least one processor, cause the at least one processor to operate with the at least one display device and the at least one input device to:

(i) enable a player to place a wager on a play of the game, (ii) display, in association with the play of the game, the plurality of wheels, (iii) activate each of the wheels simultaneously, (iv) cause all of the active wheels to spin, (v) cause all of the active wheels to stop, wherein all of the active wheels are stopped prior to any subsequent spinning of any of the active wheels, and (vi) after all of the active wheels have spun and stopped:

(A) cause at least one of the indicators to indicate at least one of the symbols on each of the active wheels, (B) determine whether to provide an award to the player, wherein the determination is based on each of the symbols indicated on each of the active wheels which has stopped, (C) if the determination is to provide the award to the player, cause the determined award to be provided to the player, and (D) after the determination whether to provide the award to the player:

(1) in response to none of the discontinue symbols being indicated on any one of the active wheels which has stopped, repeat (iv) to (vi) for all of the active wheels, (2) in response to one of the discontinue symbols being indicated on at least one, but less than all, of the active wheels which have stopped:

(x) deactivate each wheel associated with the indicated discontinue symbol, and (y) repeat (iv) to (vi) for each wheel which is not deactivated, and (3) in response to one of the discontinue symbols being indicated on all of the active wheels which have stopped, deactivate all of the active wheels.

40. The gaming system of claim 39, which includes at least one instruction stored in the at least one memory device which when executed by the at least one processor causes the at least one processor to operate with the at least one display device and the at least one input device to, if the discontinue symbol is indicated on any of the wheels, deactivate at least one of: (i) the wheel, (ii) the indicator associated with the wheel, and (iii) the wheel and the associated indicator.

41. The gaming system of claim 40, which includes at least one instruction stored in the at least one memory device which when executed by the at least one processor causes the at least one processor to operate with the at least one display device and the at least one input device to: (i) randomly determine which one of the symbols will be indicated for each active wheel, and (ii) indicate said randomly determined symbol for each active wheel.

42. The gaming system of claim 39, wherein the plurality of instructions, which when executed by the at least one processor, cause the at least one processor to cause at least one of: (i) all of the active wheels to spin simultaneously, and (ii) all of the active wheels to stop simultaneously.

43. A gaming system comprising:

at least one display device;

at least one user input device;

at least one processor; and at least one memory device which stores a plurality of instructions which when executed by the at least one processor cause the at least one processor to operate with the at least one display device and the at least one input device to:

(a) enable a player to place a wager on a play of a game;

(b) display, in association with the play of the game, a plurality of wheels, each of the wheels including at least one value symbol and at least one discontinue symbol, (c) determine an active group of the wheels, the active group of the wheels including a plurality of wheels, (d) spin all of the wheels of the active group, (e) stop all of the wheels of the active group, wherein all of the wheels of the active group are stopped prior to any subsequent spinning of any of the wheels of the active group, and (f) after all of the wheels of the active group have spun and stopped:

(i) indicate at least one of the symbols on each of the stopped wheels of the active group, (ii) in response to the at least one value symbol and no discontinue symbols being indicated on all of the stopped wheels of the active group:

(A) determine an award to provide to the player, wherein the determination is based on each of the value symbols indicated on each of the stopped wheels, (B) cause the determined award to be provided to the player, and (C) repeat (d) to (f) for all of the wheels of the active group, (iii) in response to one of the discontinue symbols being indicated on at least one, but less than all, of the stopped wheels of the active group:

(A) deactivate each wheel associated with the indicated discontinue symbol from the active group, (B) determine an award to provide to the player, wherein the determination is based on each of the value symbols indicated on each of the stopped wheels, (C) cause the determined award to be provided to the player, and (D) repeat (d) to (f) for each wheel which is not deactivated from the active group, and (iv) in response to one of the discontinue symbols being indicated on all of the stopped wheels of the active group, deactivate all of the wheels of the active group.

44. The gaming system of claim 43, which includes at least one instruction stored in the at least one memory device which when executed by the at least one processor causes the at least one processor to operate with the at least one display device and the at least one input device to cause any deactivated wheels to not spin for a remainder of the play of the game.

45. The gaming system of claim 43, wherein the plurality of instructions, which when executed by the at least one processor, cause the at least one processor to cause at least one of: (i) all of the wheels of the active group to simultaneously spin, and (ii) all of the wheels of the active group to simultaneously stop.

* * * * *

UNITED STATES PATENT AND TRADEMARK OFFICE

CERTIFICATE OF CORRECTION

PATENT NO. : 7,841,936 B2
APPLICATION NO. : 10/985350
DATED : November 30, 2010
INVENTOR(S) : Berman et al.

It is certified that error appears in the above-identified patent and that said Letters Patent is hereby corrected as shown below:

IN THE CLAIMS:

In Claim 1, Column 30, Line 46, replace “group;” with --group; and--.

In Claim 27, Column 33, Line 8, replace “shapes;” with --shapes; and--.

In Claim 27, Column 33, Lines 28 to 29, replace “none of the discontinue symbols” with --none of a plurality of discontinue symbols--.

In Claim 32, Column 34, Line 13, replace “,” with --;--.

In Claim 32, Column 34, Line 23, replace “group,” with --group, and--.

In Claim 32, Column 34, Line 38, replace “none of the discontinue symbols” with --none of a plurality of discontinue symbols--.

In Claim 39, Column 35, Line 32, replace “wheels,” with --wheels, and--.

In Claim 39, Column 35, Line 35, replace “wheels,” with --wheels, and--.

Signed and Sealed this
Twenty-second Day of February, 2011

David J. Kappos

David J. Kappos
*Director of the United States Patent and Trademark Office*